United States Patent
Tanaka et al.

(10) Patent No.: US 10,541,561 B2
(45) Date of Patent: Jan. 21, 2020

(54) POWER FEED SYSTEM

(71) Applicant: Yazaki Corporation, Tokyo (JP)

(72) Inventors: Shingo Tanaka, Yokosuka (JP); Satoru Horiuchi, Yokosuka (JP)

(73) Assignee: Yazaki Corporation, Tokyo (JP)

( * ) Notice: Subject to any disclaimer, the term of this patent is extended or adjusted under 35 U.S.C. 154(b) by 413 days.

(21) Appl. No.: 15/094,128

(22) Filed: Apr. 8, 2016

(65) Prior Publication Data
US 2016/0226316 A1 Aug. 4, 2016

Related U.S. Application Data

(62) Division of application No. 13/996,133, filed as application No. PCT/JP2011/079456 on Dec. 20, 2011.

(30) Foreign Application Priority Data

Dec. 21, 2010 (JP) .................. 2010-284476
Dec. 21, 2010 (JP) .................. 2010-284478

(51) Int. Cl.
H02J 50/50 (2016.01)
H02J 50/12 (2016.01)
(Continued)

(52) U.S. Cl.
CPC .............. H02J 50/12 (2016.02); B60L 53/12 (2019.02); B60L 53/36 (2019.02); H01F 38/14 (2013.01);
(Continued)

(58) Field of Classification Search
None
See application file for complete search history.

(56) References Cited

U.S. PATENT DOCUMENTS

2009/0134712 A1* 5/2009 Cook ............... H02J 50/12
307/104
2010/0045114 A1* 2/2010 Sample ............ H02J 50/12
307/104
(Continued)

FOREIGN PATENT DOCUMENTS

JP 07-289535 A 11/1995
JP 2010-063245 A 3/2010
(Continued)

OTHER PUBLICATIONS

International Search Report dated Mar. 13, 2012, issued for PCT/JP2011/079456.
(Continued)

Primary Examiner — Daniel Kessie
(74) Attorney, Agent, or Firm — Locke Lord LLP

(57) ABSTRACT

Disclosed is a power feed system which can highly efficiently feed power to a power receiving unit from a power feed-side even though distance fluctuation or lateral shift occurs between a power feed-side helical coil and a power receiving-side helical coil. A distance measuring unit measures a inter-coil distance $L_1$ between the power feed-side helical coil and the power receiving-side helical coil, and a control units, adjust capacitances of a power feed-side varactor and a power receiving-side varactor in accordance with the inter-coil distance $L_1$ measured by the measuring unit.

3 Claims, 20 Drawing Sheets

(51) Int. Cl.
   *H02J 50/80*   (2016.01)
   *H02J 50/40*   (2016.01)
   *H02J 7/02*    (2016.01)
   *B60L 53/36*   (2019.01)
   *B60L 53/12*   (2019.01)
   *H01F 38/14*   (2006.01)
   *H02J 50/90*   (2016.01)

(52) U.S. Cl.
   CPC .............. *H02J 7/025* (2013.01); *H02J 50/40* (2016.02); *H02J 50/80* (2016.02); *H02J 50/90* (2016.02); *B60L 2210/30* (2013.01); *B60L 2210/40* (2013.01); *Y02T 10/7005* (2013.01); *Y02T 10/7072* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

U.S. PATENT DOCUMENTS

| | | | |
|---|---|---|---|
| 2010/0123452 A1 | 5/2010 | Amano et al. | |
| 2010/0164295 A1 | 7/2010 | Ichikawa et al. | |
| 2010/0244580 A1* | 9/2010 | Uchida | H02J 5/005 307/104 |
| 2011/0049995 A1* | 3/2011 | Hashiguchi | H02J 5/005 307/104 |
| 2011/0148215 A1 | 6/2011 | Marzetta et al. | |
| 2011/0241440 A1 | 10/2011 | Sakoda et al. | |
| 2012/0080957 A1* | 4/2012 | Cooper | H02J 5/005 307/104 |

FOREIGN PATENT DOCUMENTS

| | | |
|---|---|---|
| JP | 2010-068657 A | 3/2010 |
| JP | 2010-119246 A | 5/2010 |
| JP | 2010-124522 A | 6/2010 |
| JP | 2010-239769 A | 10/2010 |
| JP | 2010-252497 A | 11/2010 |
| JP | 2010-252498 A | 11/2010 |
| WO | WO-2011/008669 A1 | 1/2011 |

OTHER PUBLICATIONS

Office Action dated Jan. 13, 2015, issued for the Japanese patent application No. 2010-284478 and English translation thereof.
Office Action dated Jan. 13, 2015, issued for the Japanese patent application No. 2010-284476 and English translation thereof.
Office Action dated Nov. 18, 2014, issued for the Chinese patent application No. 201180061500.0 and English translation thereof.
Office Action dated Mar. 24, 2015, issued for the corresponding Japanese patent application No. 2010-284478 and English translation thereof.

* cited by examiner

POWER FEED SYSTEM

This application is a divisional application of U.S. application Ser. No. 13/996,133 filed Jun. 20, 2013 which claims the right of priority under 35 U.S.C. § 119 based on Japanese Patent Application Nos. 2010-284476 and 2010-284478 both filed Dec. 21, 2010.

TECHNICAL FIELD

This invention relates to power feed systems, in particular to power feed systems for supplying power in non-contact manner to power receiving-side coils from power feed-side coils.

BACKGROUND ART

As power feed systems mentioned above is well known the one that is shown in FIG. 29 (refer to PTLs 1 and 2) for example. As shown in the figures, a power feed system 1 is provided with a power feed unit 3 as a power feed unit means, a power receiving unit 5 as a power receiving unit means. The aforementioned power feed unit 3 is provided with a power feed-side loop antenna 6 with which power is supplied, a power feed-side helical coil 7 as a power feed-side coil electromagnetically coupled with the power feed-side loop antenna 6. When power is supplied with the aforementioned power feed-side loop antenna 6, the power is transmitted to the power feed-side helical coil 7 by electromagnetic induction.

The aforementioned power receiving unit 5 is provided with a power receiving-side helical coil 9 electromagnetically resonated with the power feed-side helical coil 7, and a power receiving-side loop antenna 10 electromagnetically connected with the power receiving-side helical coil 9. When power is fed to the power feed-side helical coil 7, the power is wirelessly fed to the power receiving-side helical coil 9.

Furthermore, when power is fed to the power receiving-side coil 9, the power is fed to the power receiving-side loop antenna 10 by electromagnetic induction, supplied with a load that is connected with the power receiving-side loop antenna 10. According to the power feed system 1, it is made possible to feed power supplied from the power feed unit to the power receiving unit in the non-contact manner by electromagnetic induction between the power feed-side helical coil 7 and the power receiving-side helical coil 9.

It has been designed to feed power in the non-contact manner employing the aforementioned power feed system 1 to a load that is mounted in automobiles by providing the aforementioned power receiving unit 5 and the power feed unit 3 with the automobiles and such road, respectively.

A distance between the power receiving unit 5 mounted in the automobiles and the power feed unit 3, however, varies in accordance with types of the automobiles. Namely, an inter-coil distance $L_1$ between the power receiving-side helical coil 9 of the power receiving unit 5 and the power feed-side helical coil 7 of the power feed unit 3 is varied in accordance with the types of the automobiles. For example, the inter-coil distance $L_1$ becomes short when the power receiving unit 5 is mounted in automobiles with low body such as sports cars, whereas the inter-coil distance $L_1$ becomes long when the power receiving unit 5 is mounted in automobiles with tall body such as station wagons.

The inventors then measured transit characteristics S21 and reflection characteristics S11 of the power receiving-side loop antenna 10 when the inter-coil distance $L_1$ ranges from 100 millimeters (mm) to 400 mm while a radius of both the power feed-side loop antenna 6 and the power receiving-side loop antenna 10 of the power feed system 1 is fixed to 206 mm as shown in FIG. 29. The result is shown in FIGS. 30 to 32.

As apparent from the FIG. 30, fluctuation of the inter-coil distance $L_1$ in the aforementioned power feed system 1 causes the transit characteristics S21 to vary. It is mainly caused, as found in FIGS. 31 and 32, by misalignment between the power feed-side helical coil 7 and the power receiving-side helical coil 9.

To explain more fully, when the radius of both the power feed-side loop antenna 6 and the power receiving-side loop antenna 10 is fixed to 206 mm, the inter-coil distance $L_1$, when 200 mm, lies in nearly critical coupling, but shorter the inter-coil distance $L_1$ becomes than that, the tightly the power feed unit 3 and the power receiving unit 5 is coupled, exhibiting bi-resonance characteristics, resulting in variation of frequency where transit characteristics becomes 1.

Accordingly, when operating frequency is fixed to nearly 13.5 megahertz (MHz), the transit characteristics S21, upon the inter-coil distance $L_1$ being 200 mm, becomes nearly 1, leading to high efficiency, whereas the transit characteristics S21, if the inter-coil distance $L_1$ shifting to 100 mm, decreases to nearly 0.64, causing increase of loss.

On the other hand, the longer the inter-coil distance $L_1$, the looser the coupling between the power feed-side helical coil 7 and the power receiving-side helical coil 9 becomes, causing impedance matching to each other to uncouple, and thus loss to increase.

As can be seen from the above, there has been posed drawback that fluctuation of the inter-coil distance $L_1$ makes power feeding efficiency from the power feed unit 3 to power receiving unit 5 vary, so as to increase the loss. Furthermore, there has been posed drawback that as shown in FIG. 9, when lateral shift x occurs that axis is shifted between the power feed-side loop antenna 6 or the power feed-side helical coil 7, and the power receiving-side loop antenna 10 or the power receiving-side helical coil 9, fluctuation of the inter-coil distance $L_1$ also causes power feeding efficiency from the power feed unit 3 to power receiving unit 5 to vary, so as to increase the loss.

CITATION LIST

Patent Literature

[PTL 1]
Japanese Patent Application Laid-Open Publication No. 2010-124522
[PTL 2]
Japanese Patent Application Laid-Open Publication No. 2010-68657

SUMMARY OF INVENTION

Technical Problem

Therefore, an object of the invention is to provide a power feed system that can supply power highly efficiently from a power feed unit to a power receiving unit even if distance fluctuation between power feed-side helical coil and power receiving-side helical coil occurs, or lateral shift therebetween occurs.

Solution to Problem

An invention recited in a first aspect to resolve the above-mentioned problem is related to a power feed system, comprising: a power feed unit provided with a power feed-side loop antenna for receiving power, and a power feed-side coil electromagnetically coupled with the power feed-side loop antenna; a power receiving unit provided with a power receiving-side coil electromagnetically resonated with the power feed-side coil, and a power receiving-side loop antenna electromagnetically coupled with the power receiving-side coil; and a capacitor connected in parallel with at least one of the power feed-side coil and the power receiving-side coil, arranged variable in a capacitance thereof.

Preferably, a power feed system includes a distance measuring unit for measuring a distance between the power feed-side coil and the power receiving-side coil, and an adjusting unit for adjusting capacitance of the capacitor in accordance with the distance measured by the distance measuring unit.

Preferably, a power feed system includes a reflection measuring unit for measuring a reflection from the power feed-side coil, and an adjusting unit for adjusting capacitance of the capacitor in accordance with the reflection amount measured by the reflection measuring unit.

An invention recited in a second aspect, is related to a power feed system, comprising: a power feed unit provided with a power feed-side loop antenna for receiving power, and a power feed-side coil electromagnetically coupled with the power feed-side loop antenna; and a power receiving unit provided with a power receiving-side coil electromagnetically resonated with the power feed-side coil, and a power receiving-side loop antenna electromagnetically coupled with the power receiving-side coil, wherein at least one of the power feed-side loop antenna and the power receiving-side loop antenna is divided into a plurality of members, and wherein the plurality of members being configured to move and change contact position relative to each other so as to vary a loop dimension thereof.

Preferably, the plurality of members is overlaid and contacted to each other so as to form a loop.

Preferable, at least one of the plurality of members includes at an end thereof a recess recessed in a middle direction, the recess being configured to slidably receive an end of an adjacent member of the plurality of members.

Preferably, the power feed system further includes a moving unit for moving the plurality of members, a distance measuring unit for measuring distance between the power feed-side loop antenna and the power receiving-side loop antenna, and a moving unit control unit for controlling the moving unit to moving unit the plurality of members so that the loop dimension accords with the distance measured by the distance measuring unit.

Preferably, the power feed system further includes a moving unit for moving the plurality of members, a reflection measuring unit for measuring a reflection from the power receiving-side coil, and a moving unit control unit for controlling the moving unit to move the plurality of members in accordance with the reflection amount measured by the reflection measuring unit.

Advantageous Effects of Invention

According to the invention recited in the first aspect, the capacitor arranged variable in its capacitance is connected with one of the power feed-side coil and the power receiving-side coil. Since varying the capacitance of the capacitor results in variation of efficiency, it is made possible to supply power highly efficiently by varying the capacitance of the capacitor in accordance with a distance between the power feed-side coil and the power receiving unit or a lateral shift therebetween even if the distance between the power feed-side coil and the power receiving unit occurs or a lateral shift therebetween occurs.

According to the invention, since the distant measures unit for measuring a distance between the power feed-side coil and the power receiving-side coil, and an adjusting unit for adjusting capacitance of the capacitor in accordance with the distance measured by the distance measuring unit, it is made possible to supply power highly efficiently and automatically even if fluctuation of the distance between the power feed-side coil and the power receiving unit occurs or lateral shift therebetween occurs.

According to the invention, since the reflection measuring unit measures a reflection from the power feed-side coil, and the adjusting unit adjusts capacitance of the capacitor in accordance with the reflection measured by the reflection measuring unit, it is made possible to supply power highly efficiently and automatically even if fluctuation of the distance between the power feed-side coil and the power receiving unit occurs or lateral shift therebetween occurs.

According to the invention of the second aspect, at least one of the power feed-side loop antenna and the power receiving-side loop antenna is divided into a plurality of members, and the plurality of members is moved to change contact position relative to each other so as to vary a loop dimension. Since varying the capacitance of the capacitor results in variation of efficiency, it is made possible to supply power highly efficiently by varying the capacitance of the capacitor in accordance with a distance between the power feed-side coil and the power receiving unit or a lateral shift therebetween, even if fluctuation of the distance between the power feed-side coil and the power receiving unit occurs or a lateral shift therebetween occurs.

According to the invention, since the plurality of members is overlaid to each other, it is made possible to vary contact position of the plurality of members in a simple structure.

According to the invention, since at least one of the plurality of members includes at its end a recess recessed in a middle direction of its end, and the recess configured to slidably receive an end of an adjacent member of the plurality of members, it is made possible to vary contact position of the plurality of members in a simple structure.

According to the invention, since the distance measuring unit measures a distance between the power feed-side loop antenna and the power receiving-side loop antenna, and the moving unit control unit controls the moving unit to move the plurality of members so that the loop dimension accords with the distance measured by the distance measuring unit, it is made possible to supply power highly efficiently and automatically even if fluctuation of the distance between the power feed-side coil and the power receiving unit occurs or lateral shift therebetween occurs.

According to the invention, since the moving unit moves the plurality of members, and the reflection measuring unit measures a reflection from the power receiving-side coil, and the moving unit control unit controls the moving unit to move the plurality of members in accordance with the reflection measured by the reflection measuring unit, it is made possible to supply power highly efficiently and automatically even if fluctuation of the distance between the power feed-side coil and the power receiving unit occurs or lateral shift herebetween occurs.

DESCRIPTION OF EMBODIMENTS

A First Embodiment

Figure 1:
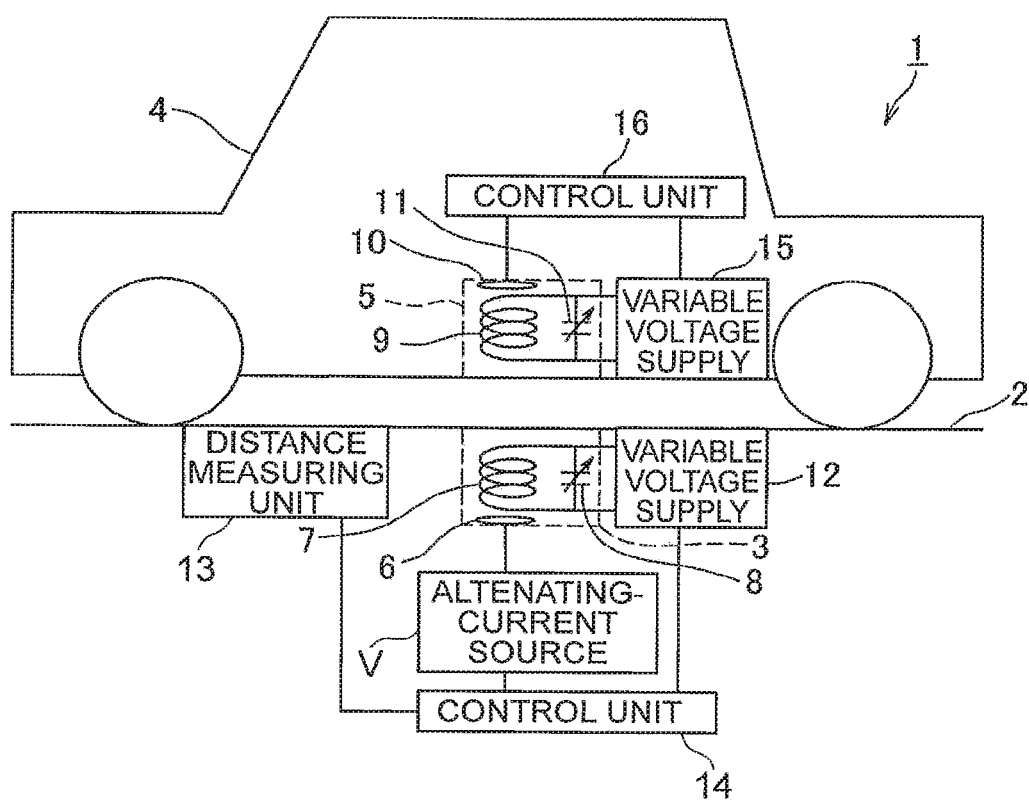
FIG. 1 is a view illustrating a power feed system in a first embodiment.
Figure 2:
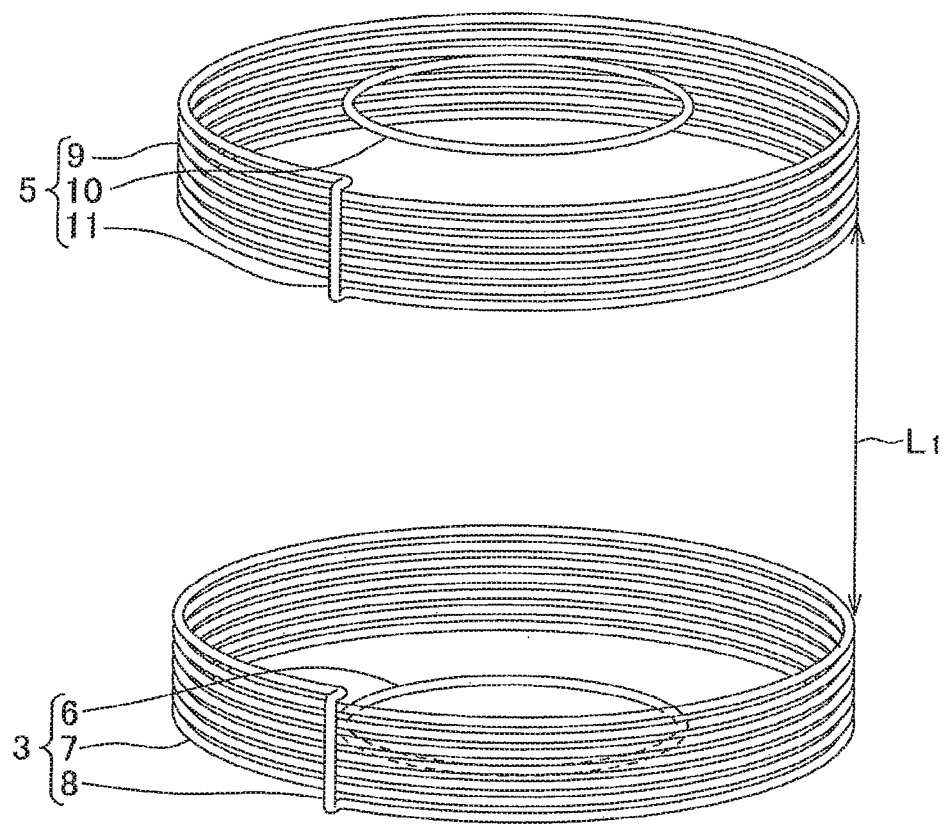
FIG. 2 is a perspective view illustrating a configuration of the power feed system illustrated in FIG. 1.

Hereinafter, a power feed system of the invention is described with reference to attached drawings. FIG. 1 illustrates the power feed system of the invention in the first embodiment. FIG. 2 illustrates the perspective view illustrating configuration of the power feed system illustrated in FIG. 1. As shown in FIG. 2, the power feed system 1 is provided with a power feed unit 3 as feeding means disposed on such road 2, a power receiving unit 5 mounted in such a body of an automobile 4.

The aforementioned power feed unit 3 is as shown in FIGS. 1 and 2, provided with a power feed-side loop antenna 6 to be supplied with power, a power feed-side helical coil 7 as power feed-side coil electromagnetically coupled with the power feed-side loop antenna 6, a power feed unit varactor 8 as capacitor connected parallel with the power feed-side helical coil 7. This power feed-side loop antenna 6 is circular-loop-shaped, an axis of which is arranged in a direction toward the body of the automobile 4 from the road 2, i.e., in a perpendicular direction. The aforementioned power feed-side loop antenna 6 is supplied with alternating-current power from an alternating-current power source V.

The aforementioned power feed-side helical coil 7 is configured in such a way that, for example, winding wire is wound in a coil shape with a diameter larger than that of the power feed-side loop antenna 6. The power feed-side helical coil 7 is arranged in the same axis as the power feed-side loop antenna 6 at the side of the automobile 4 of the power feed-side loop antenna 6. In the present embodiment the power feed-side loop antenna 6 is arranged in the same plane as winding wire of the power feed-side helical coil 7 at the farthest side away from the automobile 4.

It follows from this that the power feed-side loop antenna 6 and the power feed-side helical coil 7 are arranged apart from each other within a scope of their being electromagnetically coupled with each other, i.e., that when alternating-current power is supplied to the power feed-side loop antenna 6, conductive current occurs in the power feed-side helical coil 7. The aforementioned power feed unit varactor 8 is a diode in which capacitance varies in accordance with voltage applied to across the diode.

The aforementioned power receiving unit 5 is provided with a power receiving-side helical coil 9 electromagnetically resonated with the power feed-side helical coil 7, a power receiving-side loop antenna 10 electromagnetically coupled with the power receiving-side helical coil 9, and a power receiving-side varactor 11 connected parallel with the power receiving-side loop antenna 10. The aforementioned power receiving-side loop antenna 10 is connected with a load such as not-shown automobile-mounted battery. The aforementioned power receiving-side loop antenna 10 is formed into a loop shape, axis of which is arranged in the direction toward the road 2 from the body of the automobile 4, i.e., in the perpendicular direction.

The aforementioned power receiving-side helical coil 9 is disposed in the same manner as the power feed-side helical coil 7, composed of a coil with a diameter larger than that of power feed unit 6 or power receiving-side loop antenna 10. The power receiving-side helical coil 9 is also arranged at the side of the road 2 of the foregoing power receiving-side loop antenna 10 in the same axis as the power receiving-side loop antenna 10. In the present embodiment the power receiving-side loop antenna 10 is arranged in the same plane as winding wire of the power receiving-side helical coil 9 farthest away from the road 2.

It follows from this that the power receiving-side loop antenna 10 and the poser receiver helical coil 9 are arranged apart from each other within a scope of their being electromagnetically coupled with each other, i.e., that when alternating-current power is supplied to the power receiving-side loop antenna 9, conductive current occurs in the power receiving-side helical coil 10.

According to the aforementioned power feed system 1 when the automobile 4 approaches the power feed unit 3, and the power feed-side helical coil 7 and the power receiving-side helical coil 9 oppose each other at intervals in its axis direction, the power feed-side helical coil 7 and the power receiving-side helical coil 9 are electromagnetically resonated with each other so as to supply power in non-contact manner to the power receiving unit 5 from the power feed unit 3.

To explain more fully, when alternating-current power is supplied with the aforementioned power feed-side loop antenna 6, the power is fed to the power feed-side helical coil 7 by electromagnetically conductive. When the power is fed to the power feed-side helical coil 7, the power is fed to the power receiving-side helical coil 9 by magnetic field resonation. Furthermore, when the power is fed to the power receiving-side helical coil 9, the power is fed to the power receiving-side loop antenna 10 by electromagnetic conductive, supplied to the load connected to the power receiving-side loop antenna 10.

Figure 3:
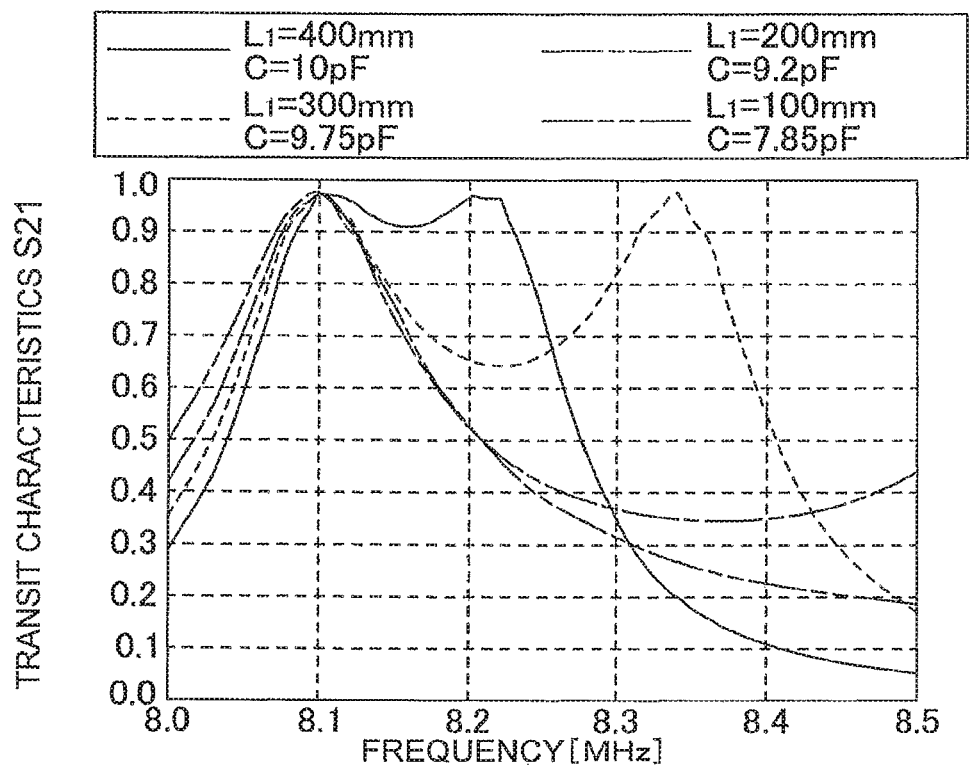
FIG. 3 is a graph illustrating a measured result of a transit characteristics S21 of the power receiving-side loop antenna when capacitance of power feed-side and power receiving-side varactor is varied in accordance with fluctuation of the inter-coil distance $L_1$ between the power feed unit and the power receiving-side helical coils of the power feed system illustrated in FIG. 1 while resonance frequency of the power feed-side and the power receiving-side helical coils is fixed to 8.1 MHz.
Figure 4:
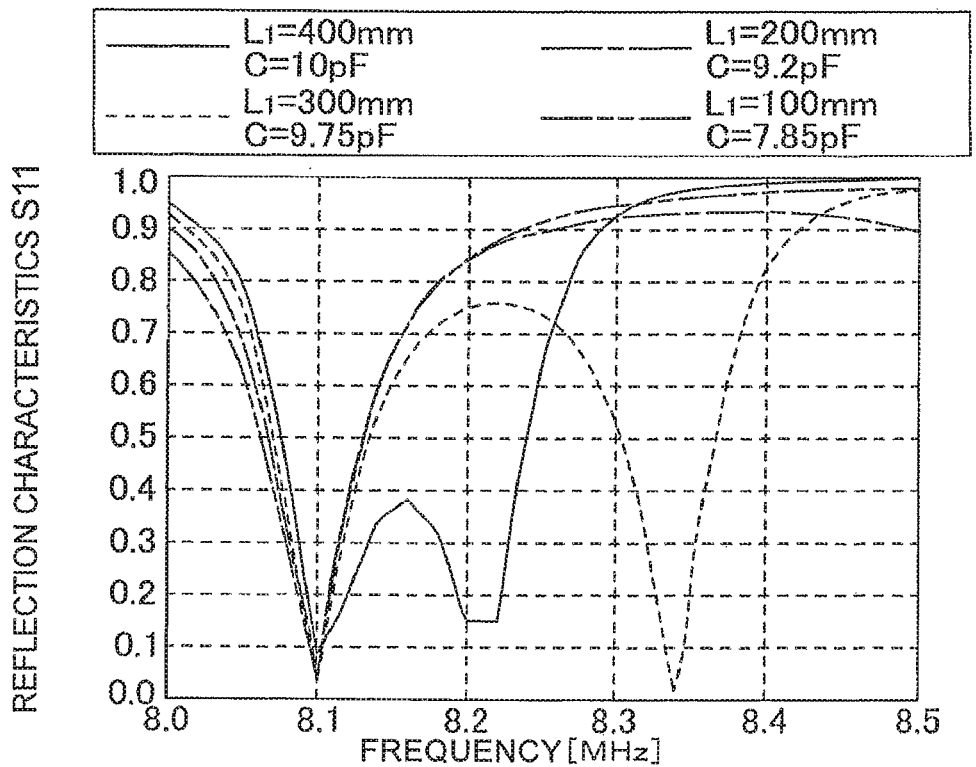
FIG. 4 is a graph illustrating a measured result of a reflection characteristics S11 of the power receiving-side loop antenna when capacitance of power feed-side varactor and power receiving-side varactor is varied in accordance with fluctuation of the inter-coil distance $L_1$ between the power feed-side and the power receiving-side helical coils of the power feed system illustrated in FIG. 1 while resonance frequency of the power feed-side and the power receiving-side helical coils is fixed to 8.1 MHz.

Next, the principle of the present invention is, before detailed description of the power feed system 1 configuration, described. In the first place, the inventor et al. measured transit and reflection characteristics, S21, S11 when each capacitance of power feed unit and power receiving-side varactor is varied in accordance with fluctuation of the inter-coil distance $L_1$ between the power feed-side helical coil 7 and the power receiving-side helical coil 9. The results are shown in FIGS. 3 and 4. In measurement of FIGS. 3 and 4, the inter-coil distance $L_1$ and capacitance C of the power feed-side varactors 8 and 11 is set as TABLE 1 shown below.

TABLE 1

| $L_1$ | Varacor capacitance |
|---|---|
| 100 mm | 7.85 pF |
| 200 mm | 9.2 pF |
| 300 mm | 9.75 pF |
| 400 mm | 10 pF |

It should be noted that in measurement shown in FIGS. 3 and 4, diameters $R_{11}$ and $R_{12}$ of the power feed-side and power receiving-side loop antenna 6, 10 correspond to 150 mm, the number of turns of the power feed-side and power receiving-side helical coil 7 and 9 to 7.

Even if the inter-coil distance $L_1$ varies as shown in the figures, varying capacitance of the power feed-side varactors 8, 11 keeps its efficiency and frequency constant. That is, if the inter-coil distance $L_1$ varies, it is made possible to obtain high efficient manner at near the frequency of 8.1 MHz.

Figure 5:
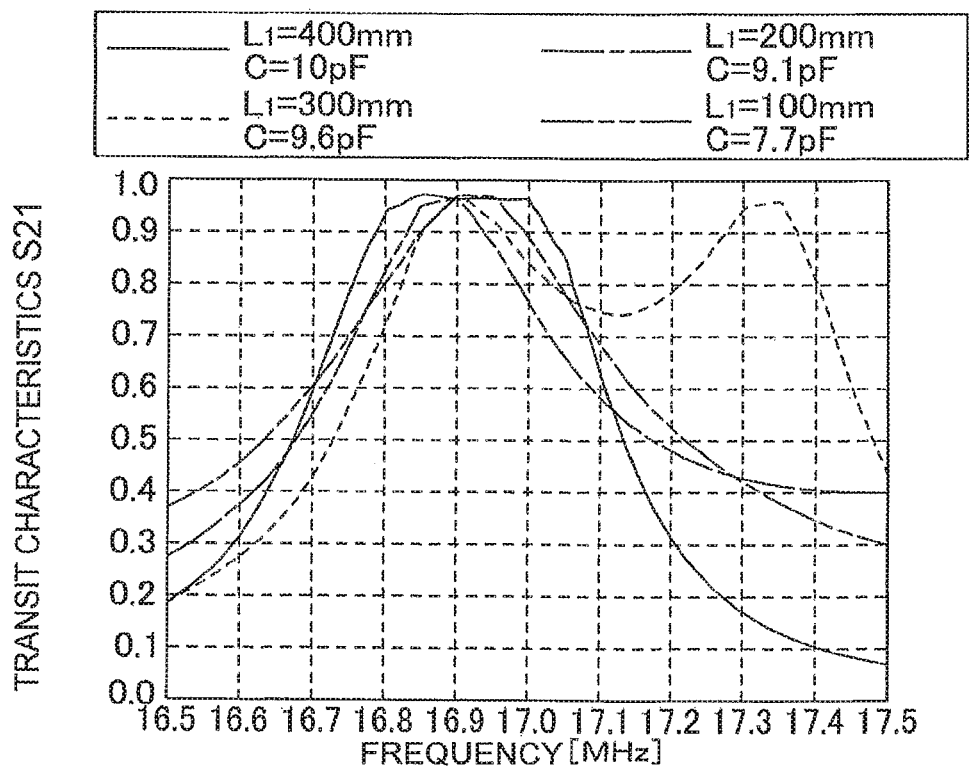
FIG. 5 is a graph illustrating a measured result of a transit characteristics S21 of the power receiving-side loop antenna when capacitance of power feed-side and power receiving-side varactors is varied in accordance with fluctuation of the inter-coil distance $L_1$ between the power-side unit and the power receiving-side helical coils of the power feed system illustrated in FIG. 1 while resonance frequency of the power feed unit and the power receiving-side helical coil s is fixed to 17 MHz.
Figure 6:
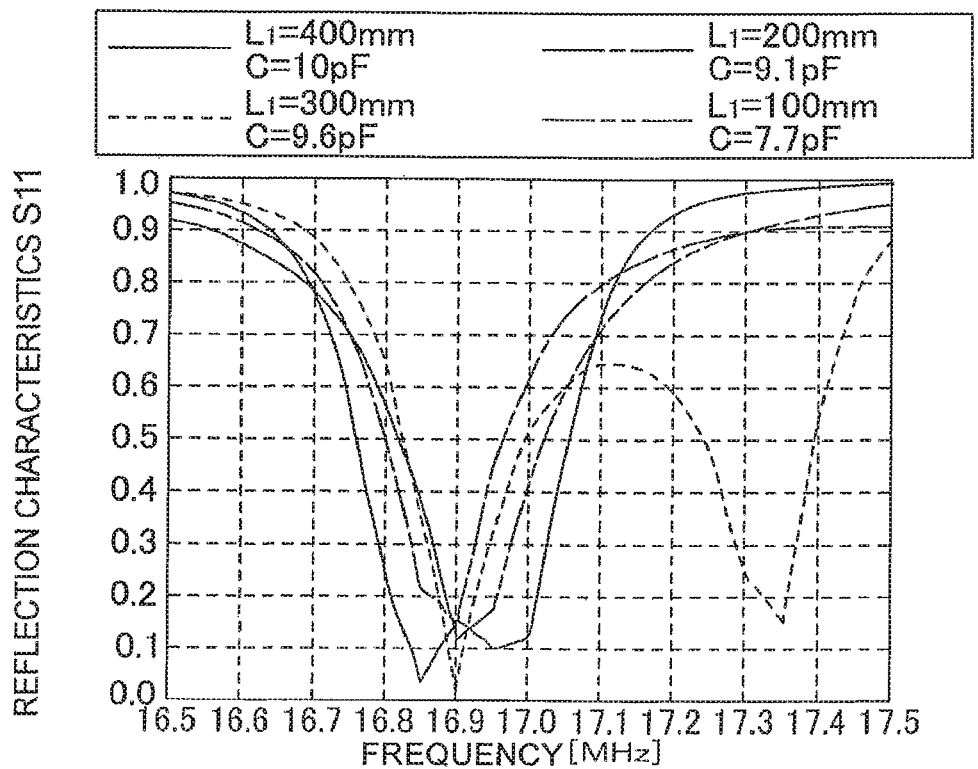
FIG. 6 is a graph illustrating a measured result of a reflection characteristics S11 of the power receiving-side loop antenna when capacitance of power feed-side and power receiving-side varactors is varied in accordance with fluctuation of the inter-coil distance $L_1$ between the power feed unit and the power receiving-side helical coils of the power feed system illustrated in FIG. 1 while resonance frequency of the power feed unit and the power receiving-side helical coil s is fixed to 17 MHz.

The inventor et al. also, in order to examine whether to obtain, if resonance frequency varies, the aforementioned result, measured the transit characteristics S21, and the reflection characteristics S11 when the number of turns of the power feed-side and the power receiving-side helical coils 7, 9 is made three, thus the resonance frequency near 17 MHz, the power feed-side and the power receiving-side varactors are varied in accordance with the inter-coil distance $L_1$. The results are shown in FIGS. 5 and 6. The inter-coil distance $L_1$ and the capacitance of the power feed-side and the power receiving-side varactors 8, 11 in the FIGS. 5 and 6 are set as TABLE 2 shown below.

TABLE 2

| $L_1$ | Varacor capacitance |
|---|---|
| 100 mm | 7.7 pF |
| 200 mm | 9.1 pF |
| 300 mm | 9.6 pF |
| 400 mm | 10 pF |

It should be noted that in the measurement shown in FIGS. 5 and 6, parameters except the number of turns of the power feed-side and the power receiving-side helical coils 7, 9 are made the same as FIGS. 3 and 4.

As shown in the figures, when the resonance frequency is made 17 MHz, or when the inter-coil distance $L_1$ varies, it is made possible to obtain high efficient manner near the frequency of 17 MHz by varying the capacitance of the power feed-side and the power receiving-side varactors 8, 11.

Then, referring again to the description of the power feed system configuration, the power feed system 1 is as shown in FIG. 1, further provided with a variable voltage supply 12 applying power across the power feed-side varactor 8, a distance measuring unit 13 for measuring the inter-coil distance $L_1$ installed at the side of the road 2, and a control unit 14 as adjusting means for controlling the variable voltage supply 12 so that voltage is applied with the power feed-side varactor 8 in accordance with the inter-coil distance $L_1$ measured by the distance measuring unit 13.

The aforementioned variable voltage supply 12 is arranged such that applying voltage is made variable. As the aforementioned distance measuring unit 13 such infrared radiation or ultra wideband (UWB) radio is considered, which measures a distance from the road 2 to the body of the automobile 4, determining the inter-coil distance $L_1$ from the measured distance. The aforementioned control unit 14 is composed of, for instance, central processing unit (CPU).

Also, the power feed system 1 is, as shown in FIG. 1, furthermore provided with a variable voltage supply 15 applying voltage across the power receiving-side varactor 11, and a control unit 16 as adjusting means for controlling the variable voltage supply 12 so that voltage is applied with the power feed-side varactor 8 in accordance with the inter-coil distance $L_1$ measured by the distance measuring unit 13. The aforementioned variable voltage supply 15 is made such that applying voltage varies. The aforementioned control unit 16 is for example composed of CPU.

Next, operation of the aforementioned power feed system 1 will be described. First, the control unit 14 introduces the inter-coil distance $L_1$ measured with the distance measuring unit 13. For example, the control unit 14 stores in a not-shown memory 1 a table indicating relationship between the inter-coils distance $L_1$ and the capacitance C of the power feed-side varactor 8 as shown in TABLES 1 and 2. The control unit 14 reads the capacitance C of the power feed-side varactor 8 corresponding to the inter-coil distance $L_1$ introduced from the table, controlling the variable voltage supply 12 so as to meet the read capacitance C.

Furthermore, the control unit 14 controls alternating-current power source V to multiplex modulation signal like AM, FM, ASK, FSK, or PSK into magnetic field when power is fed, into which the inter-coil distance $L_1$ determined by the distance measuring unit 13 is incorporated, transmitting the inter-coil distance $L_1$ to the automobile 4. The control unit 16 introduces the inter-coil distance $L_1$ from the power transmitted from the power receiving-side loop antenna 10. The control unit 16 stores in a not-shown memory a table indicating relationship between the inter-coil distance $L_1$ and the capacitance C of the power receiving-side varactor 11 as shown in TABLES 1 and 2. The control unit 16 controls the variable voltage supply 15 so as to meet the read capacitance C of the power receiving-side varactor 11 corresponding to the inter-coil distance $L_1$ introduced from the table.

According to the aforementioned power feed system 1, both the power feed-side helical coil 7 and the power receiving-side helical coil 9 are connected in parallel to the power feed-side varactors 8, 11, respectively, in which the capacitance C is arranged variable in capacitance thereof. Considering that fluctuation of the capacitance of the power feed-side varactors 8, 11 allows its efficiency to vary, varying of the capacitance of the power feed-side varactors 8, 11 in accordance with the inter-coil distance $L_1$ between the power feed-side helical coil 7 and the power receiving-side helical coil 9 makes it possible to supply power in high efficient manner even if the inter-coil distance $L_1$ between the power feed-side helical coil 7 and the power receiving-side helical coil 9 varies.

Also, according to the aforementioned power feed system 1, since the distance measuring unit 13 measures the inter-coil distance $L_1$ between the power feed-side helical coil 7 and the power receiving-side helical coil 9, and the control units 14, 16 adjust the capacitance C of the power feed-side and the power receiving-side varactors 8, 11 in accordance with the inter-coil distance $L_1$ measured by the distance measuring unit 13, it is made possible to adjust the capacitance C so as to supply power in high efficient manner and automatically even if the inter-coil distance $L_1$ between the power feed-side helical coil 7 and the power receiving-side helical coil 9 varies. It follows from this that it is made possible to supply power in high efficient manner even if the inter-coil distance $L_1$ varies caused by fluctuation of the inter-coil distance $L_1$ by vertical movement caused by suspension of the automobile 4, or caused by weight of baggage or passenger in the automobile 4.

It should be note that in the aforementioned first embodiment, the inter-coil distance $L_1$ measured by the measuring unit 13 is transmitted to the automobile 4, but the invention is not intended to be limited to this embodiment. For example, the capacitance C of the power receiving-side varactor 8 in accordance with the inter-coil distance $L_1$ aforementioned may be transmitted.

It should be noted that although in the aforementioned first embodiment, the power feed-side and the power receiving-side varactors 8, 11 are connected in parallel both with the power feed-side helical coil 7 and the power receiving-side helical coil 9, the invention is not intended to limit thereto. For example, the power receiving-side varactor 11 being removed, the power feed-side varactor 8 may be solely disposed in parallel in the power feed-side helical coil 7, and the capacitance of this power feed-side varactor 8 may be adjusted. Also, the power feed-side varactor 8 being removed, the power receiving-side varactor 11 may be solely disposed in the power receiving-side helical coil 9, and the capacitance of this power receiving-side varactor 11 may be adjusted.

According to the first embodiment, although the power feed-side and the power receiving-side varactors 8, 11 are adjusted in accordance with the inter-coil distance $L_1$ measured by the distance measuring unit 13, the invention is not intended to limit thereto. For example, the control units 14, 16, the distance measuring unit 13, the power feed-side varactor 8, and the variable voltage supply 12 are removed. And the variable voltage supply 15 is at manufacturing process, adjusted so that the power receiving-side varactor 11 meets a value corresponding to the inter-coil distance $L_1$, then the capacitance C of the power receiving-side varactor 11 may be fixed without adjusting the variable voltage supply 15. Even if the inter-coil distance $L_1$ is, also in this case, varied depending on type of automobile, it is made possible to supply power in high efficient manner using commonly the loop antennas 6, 11, and the helical coils 7, 9.

A Second Embodiment

Figure 7:
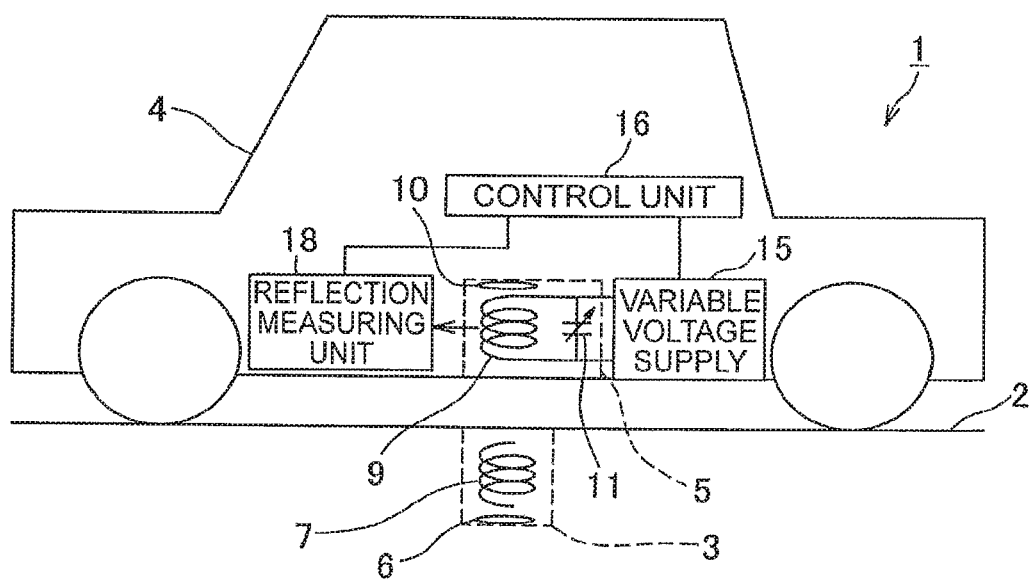
FIG. 7 is a view illustrating a power feed system in a second embodiment.

Next, a second embodiment will be described. while in the aforementioned first embodiment, based on the inter-coil distance $L_1$ measured by the distance measuring unit 13, the capacitance C of the power feed-side and the power receiving-side varactors 8, 11 are adjusted, in the second embodiment, on the other hand, as shown in FIG. 7, it is conceivable that instead for the distance measuring unit 11 a reflection measuring unit 18 is provided in the automobile 4 for measuring an amount of reflection of the power receiving-side helical coil 9, the power feed-side varactor 8 is removed, the power receiving-side varactor 11 is solely provided, and the capacitance C of the power receiving-side varactor 11 is adjusted by the control unit 16 so that the reflection characteristics S21 improves. It should be noted that the aforementioned reflection measuring unit 18 is such a unit measuring power that is fed to the power receiving-side helical coil 9, and determining the amount of reflection from the measured power, and it is thus conceivable to employ, for example, orientation coupler or circulator.

Figure 8:
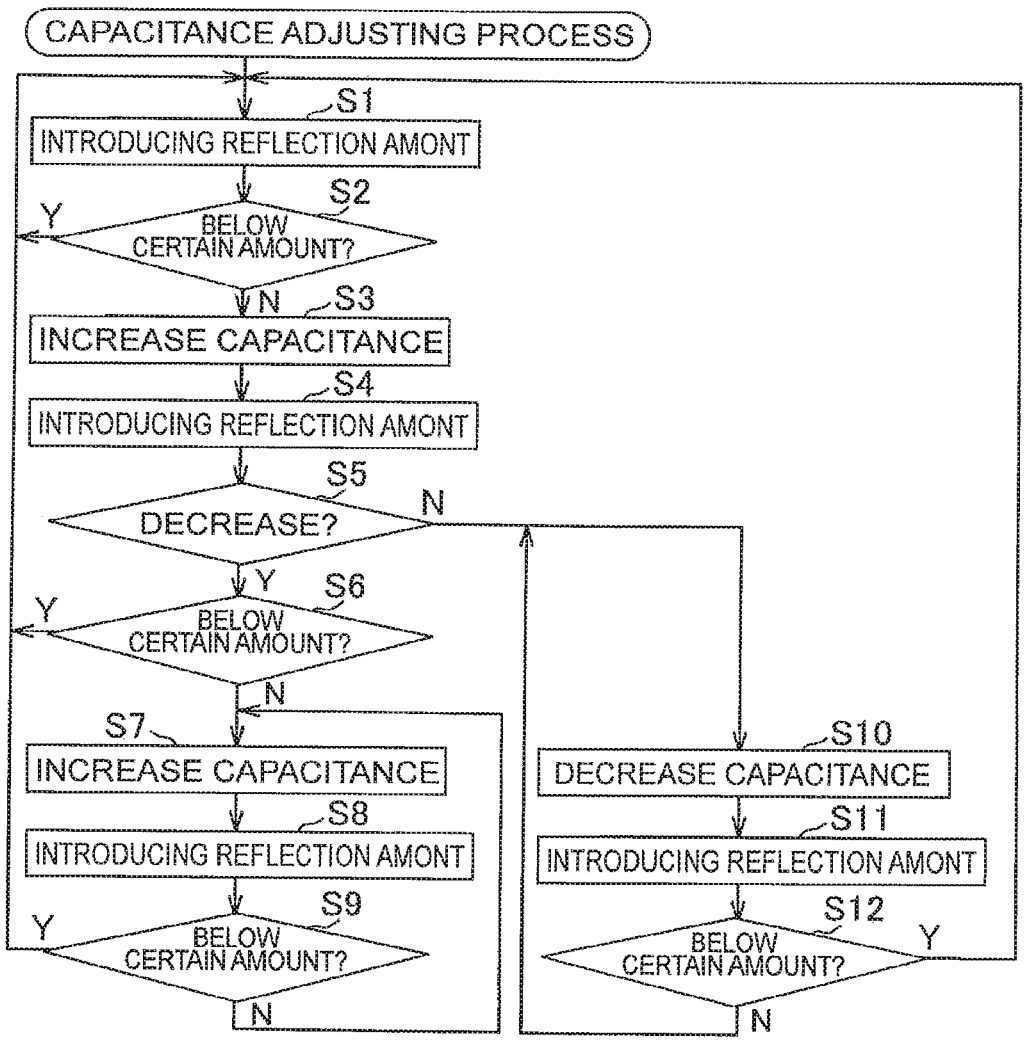
FIG. 8 is a flow diagram showing procedure for a control unit configuring the power feed unit 7 illustrated in FIG. 7.

Then, operation of the aforementioned control unit 16 is hereinafter described in detail with reference to FIG. 8. In the first place, the control unit 16, upon detecting power supply from the power feed unit 3 by power supplied to the power receiving-side helical coil 9 measured by the reflection measuring unit 18, starts capacitance adjusting process. The control unit 16 then introduces the reflection amount measured by the reflection measuring unit 18 (step S1), determining whether or not the reflection amount lies below a certain amount (step S2). The control unit 16, if the reflection amount is below the certain amount (Y in the step S2), again returns to step S1. On the contrary, the control unit 16, if the reflection amount lies above the certain amount (N in step S2), controls the variable voltage supply 15 so as to increase the capacitance C of the power receiving-side varactor 11 (step S3).

Then, the control unit 16 again introduces the reflection amount (step S4), and resulting from varying in step S3, determines if the reflection amount decrease, 3 (step S5). If the reflection amount decreases (Y in step S5), then the control unit 16 determines whether the reflection amount lies below the certain amount resulting from decrease of the reflection amount (step S6). If the reflection amount lies below the certain amount, then the control unit 16 again returns to step S1.

On the contrary, if the reflection amount exceeds the certain amount (N in step S6), the control unit 16 again increases the capacitance C of the power receiving-side varactor 11 (step S7). After that, the control unit 16 again introduces the reflection amount (step S8), the control unit 16, until the introduced reflection amount sinks below the certain amount, repeats performance of step S7. The control unit 16, when the reflection amount introduced in step S8 sinks below the certain amount (Y in step S9), again returns to step S1.

On the other hand, if the reflection amount decreases, the control unit 16 inversely decreases the capacitance C of the power receiving-side varactor 11 (step S10). After that, the control unit 16, again introduces the reflection amount (step S11), repeats step 10 until the introduced amount sinks below the certain amount. When the reflection amount introduced in step S11 sinks below the certain amount (Y in step S12), the control unit 16 again returns to step S1. According to the aforementioned second embodiment, it is made possible to supply power automatically in high efficient way.

While in the aforementioned first embodiment, reduction of efficiency is prevented that is caused by fluctuation of the distance, responding to the reflection amount in the second embodiment makes it possible to address both variations of misalignment x between the axis the power feed-side loop antenna 6 and the power feed-side helical coil 7, and that of the power receiving-side loop antenna 10 and the power receiving-side helical coil 9 and fluctuation of distance.

It should be note that according to the aforementioned second embodiment, while the power feed-side varactor 8 is removed, the present invention is not to this embodiment. For example, in a system in which the automobile 4 and the road 2 can communicate with each other, the control unit 16 may without removing the power feed-side varactor 8 transmit adjusting command to the road 2 with communication, so as to adjust the capacitance C of both the power feed-side varactor 8 and the power receiving-side varactor 11.

Furthermore, according to the aforementioned embodiment, while varactors are used as capacitor, the present invention is not to this embodiment. For example, such variable capacitor may be used, which capacitance is adjusted by mechanical operation.

A Third Embodiment

Figure 10:
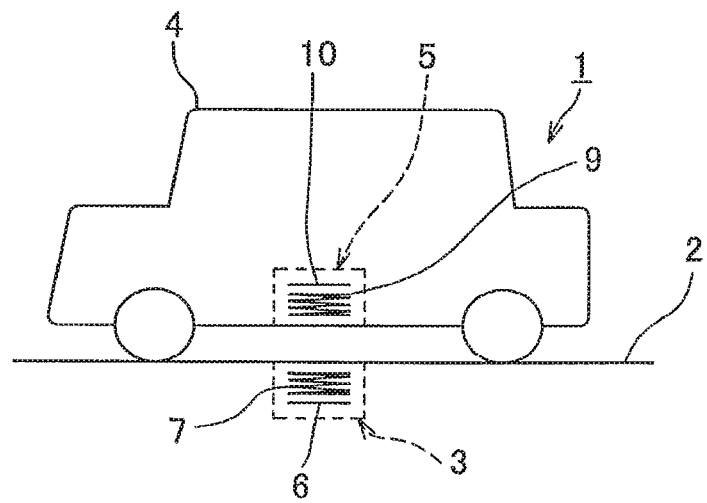
FIG. 10 is a view illustrating a power feed system of a third embodiment.
Figure 11A:
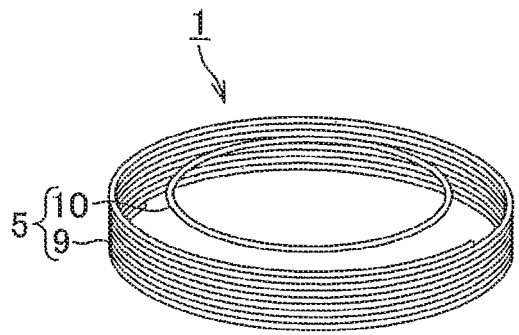
FIG. 11A is a perspective view illustrating a configuration of the power feed system shown in FIG. 10.
Figure 11B:
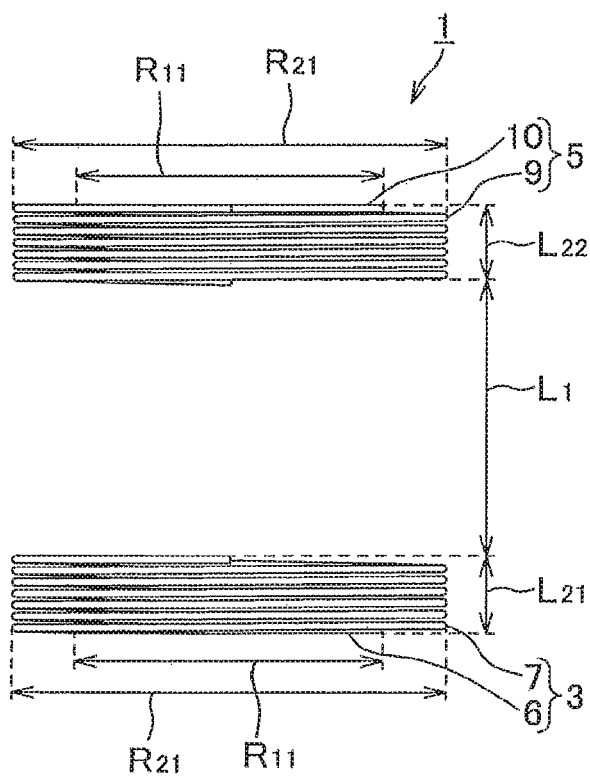
FIG. 11B is a side view illustrating a configuration of the power feed system shown in FIG. 10.
Figure 12:
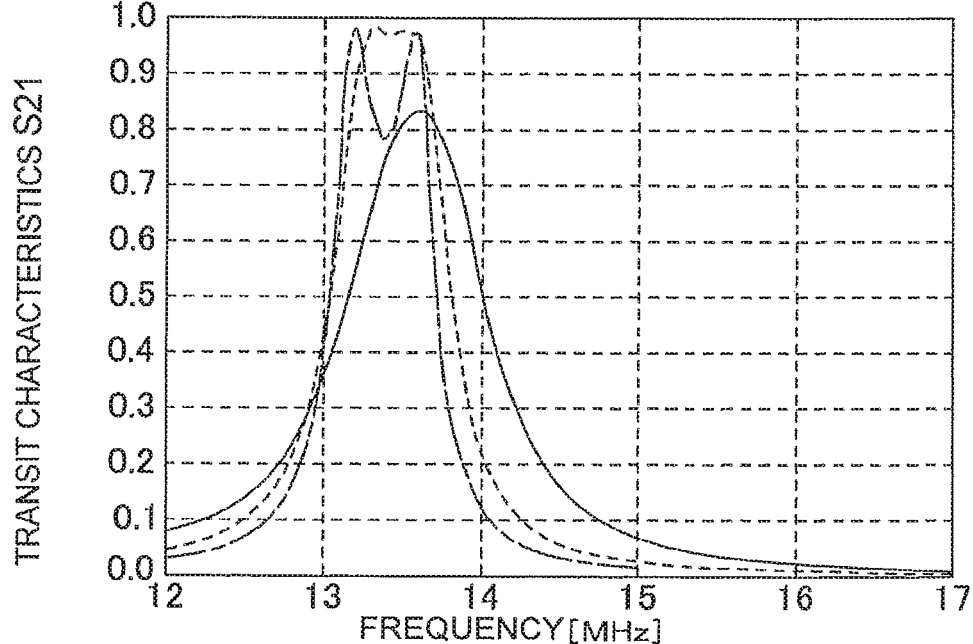
FIG. 12 is a graph illustrating a measured result of a transit characteristics S21 of the power receiving-side loop antenna when radius of power feed-side loop antenna and power receiving-side loop antenna $R_{11}$, $R_{12}$ is varied to 103 mm, 85 mm, and 75 mm while the inter-coil distance $L_1$ of the power feed system shown in FIG. 10 is fixed to 300 mm.
Figure 14:
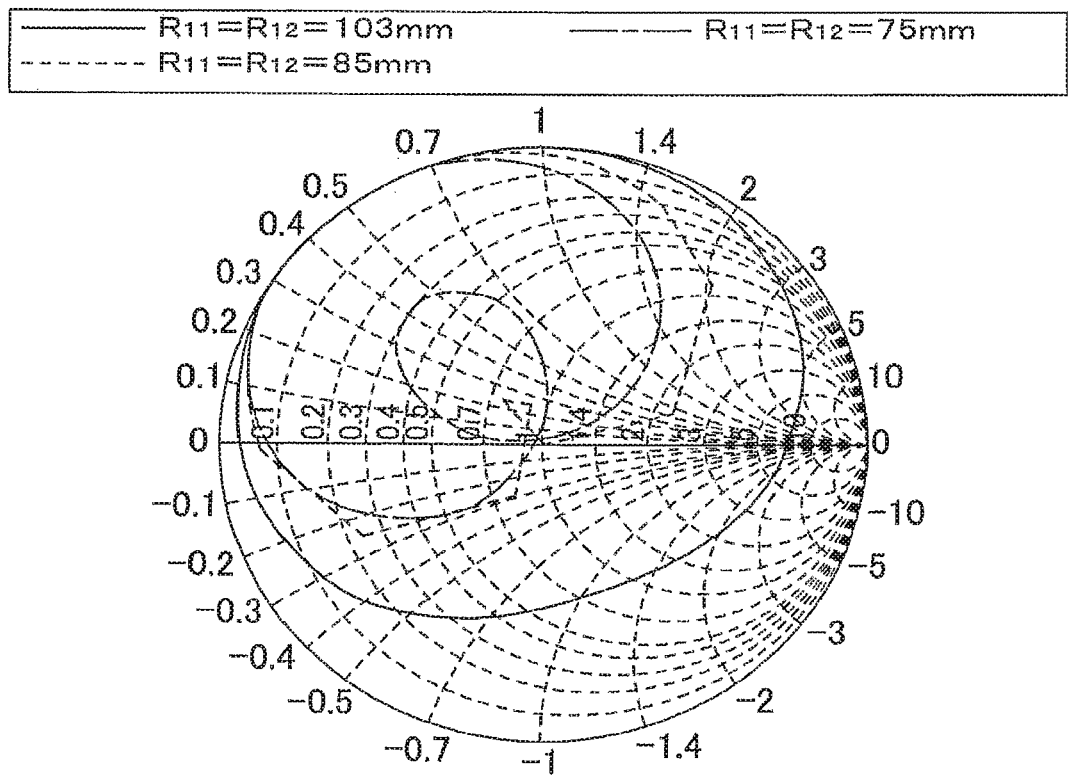
FIG. 14 is a Smith-chart illustrating a measured result of a reflection characteristics S11 of the power receiving-side loop antenna when radius of power feed-side loop antenna and power receiving-side loop antenna $R_{11}$, $R_{12}$ is varied to 103 mm, 85 mm, and 75 mm while the inter-coil distance $L_1$ of the power feed system shown in FIG. 10 is fixed to 300 mm.
Figure 15:
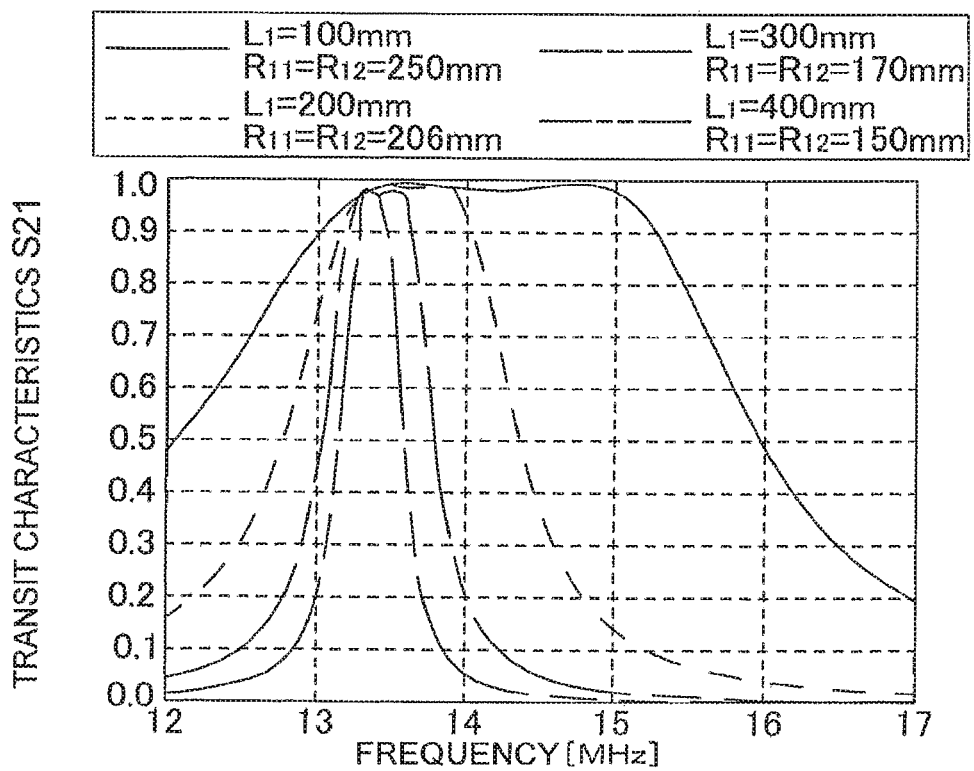
FIG. 15 is a graph illustrating a measured result of a transit characteristics S21 of the power receiving-side loop antenna when radius of power feed-side loop antenna and power receiving-side loop antenna $R_{11}$, $R_{12}$ is varied in accordance with fluctuation of the inter-coil distance $L_1$ between the power feed-side and the power receiving-side helical coils of the power feed system illustrated in FIG. 10 while resonance frequency of the power-side unit and the power receiving-side helical coils is fixed to 13.3 MHz.

Next, a power feed system of the present invention in the third embodiment will be described with reference to drawings. FIG. 10 illustrates the power feed system of the present invention in the third embodiment. FIGS. 11A and 11B illustrate schematic perspective view and side view, respectively, depicting configuration of the power feed system shown in FIG. 10. In those figures, the same reference sings are affixed for the corresponding parts of the power feed system illustrated in the aforementioned first embodiment with respect to FIG. 1, and detailed descriptions thereof are omitted. As shown in those figures, the third embodiment differs from the first embodiment in absence of the variable capacitors 8, 11, the variable voltage supplies 12, 15, the distance measuring unit 13, and the control units 14, 16, as well as in configuration of the power receiving-side loop antenna 10. It should be note that the power receiving unit antenna 10 is, though shown with circular loop in FIG. 11A in order to describe simply, actually such as shown in FIGS. 12, 14, and 15. The configuration will be described below shown in these FIGS. 12, 14 and 15.

Figure 13:
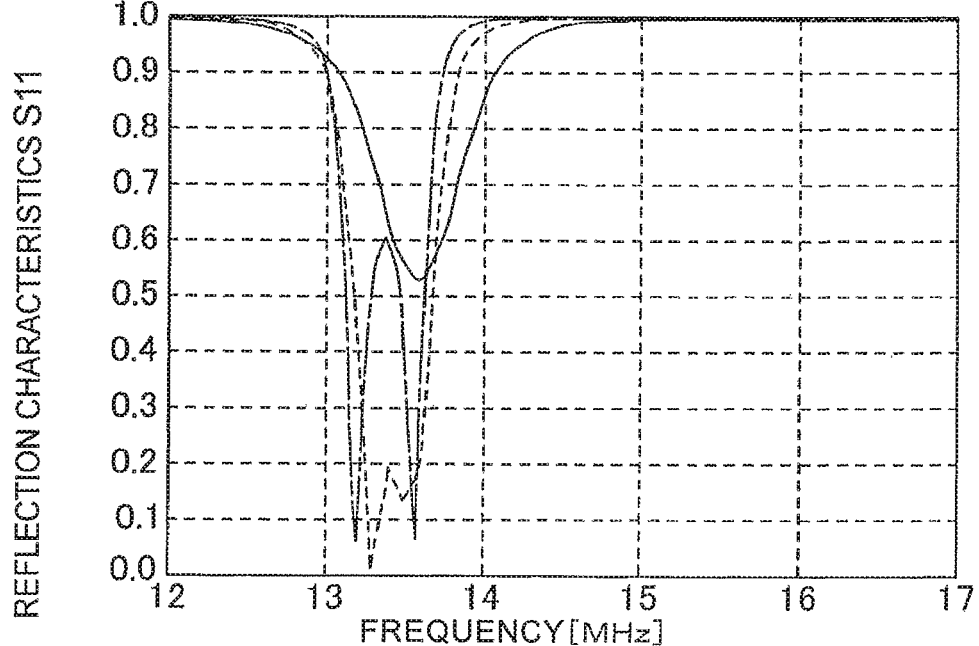
FIG. 13 is a graph illustrating a measured result of a reflection characteristics S11 of the power receiving-side loop antenna when radius of power feed-side loop antenna and power receiving-side loop antenna $R_{11}$, $R_{12}$ is varied to 103 mm, 85 mm, and 75 mm while the inter-coil distance $L_1$ of the power feed system shown in FIG. 10 is fixed to 300 mm.

Next, the principle of the present invention will be described before detailed description for the aforementioned configuration of the power feed system 1. In the first place, in order to examine how fluctuation of the radiuses of the power feed-side and power receiving unit loop antennas 6, 10 influences the transit characteristics S21 and the reflection characteristics S11, the inventor et al., measured the transit characteristics S21 and the reflection characteristics S11 when the radiuses R11, R12 of the power feed-side loop antenna 6 and of the power receiving-side loop antenna 10 is varied to 103 mm, 85 mm, and 75 mm, while the inter-coil distance $L_1$ between the power feed-side helical coil 7 and the power receiving-side helical coil 9 is fixed to 300 mm. The results are shown in FIGS. 12 to 14. As shown in those figures, it was found that fluctuation of the radiuses R11, R12 of the power feed-side loop antenna 6 and of the power receiving-side loop antenna 10 results in variations of transit and reflection characteristics, S21, S11 even though the inter-coil distance $L_1$ is fixed.

For details, it was found that enlarging the radiuses R11, R12 of the power feed-side loop antenna 6 and of the power receiving-side loop antenna 10 made coupling of the power feed unit 3 and the power receiving unit 5 change in a looseness direction, and thus loss high, or that shortening of the radius made the coupling change in a tightness direction, exhibiting co-resonance characteristics. It follows from this that when the inter-coil distance $L_1$ is shortened to render the coupling tight, enlarging the radiuses R11, R12 of the power feed-side loop antenna 6 and of the power receiving-side loop antenna 10 makes coupling controlled in the tightness direction, or that when the inter-coil distance $L_1$ is enlarges to render the coupling loose, shortening the radiuses R11, R12 of the power feed-side loop antenna 6 and of the power receiving-side loop antenna 10 makes the coupling controlled in the tightness direction, which leads the inventor et al. to operate near a boundary coupling.

Figure 16:
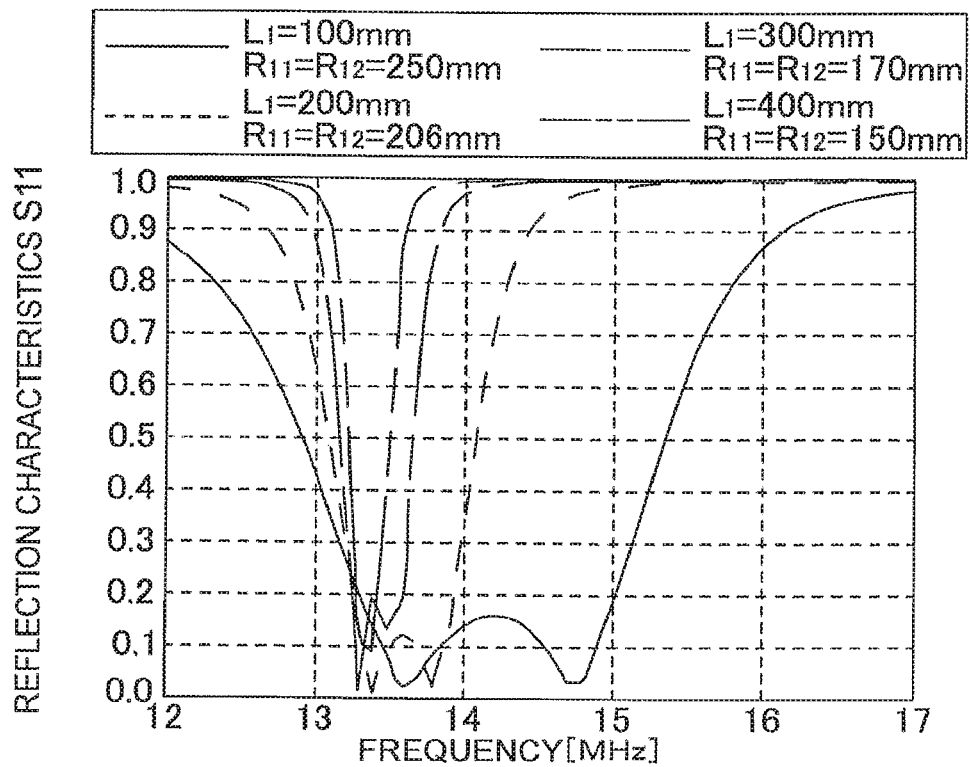
FIG. 16 is a graph illustrating a measured result of a reflection characteristics S11 of the power receiving-side loop antenna when radius of power feed-side loop antenna and power receiving-side loop antenna $R_{11}$, $R_{12}$ is varied in accordance with fluctuation of the inter-coil distance $L_1$ between the power feed-side and the power receiving-side helical coils of the power feed system illustrated in FIG. 10 while resonance frequency of the power feed-side and the power receiving-side helical coils is fixed to 13.3 MHz.

Then, the inventor et al. measured the transit characteristics S21 and the reflection characteristics S11 when the radius R11, R12 of the power feed-side and power receiving unit loop coil antennas 6, 10 is varied. The results are shown in FIGS. 15, 16. In the measurement shown in these figures, the inter-coil distance $L_1$ and the radiuses R11, R12 are set as shown in Table 3 below.

TABLE 3

| $L_1$ | $R_{11} = R_{12}$ |
|---|---|
| 100 mm | 250 mm |
| 200 mm | 206 mm |
| 300 mm | 170 mm |
| 400 mm | 150 mm |

It should be noted that in the measurement shown in FIGS. 12 to 16, as the power feed-side and the power receiving-side helical coils 7, 9, those in which the radiuses R11, R12 (refer to FIG. 11) is arranged 294 mm, the number of turns 6.5 turns, the lengths $L_{11}$, $L_{12}$ 52 mm were used.

As shown in those figures, even though the inter-coil distance $L_1$ changes, changing of the radiuses R11, R12 of the power feed-side and of power receiving unit helical coils 7, 9 can keep efficiency and frequency constant. Namely, independently of fluctuation of the inter-coil distance $L_1$, efficiency can be kept high near at frequency of 13.3 MHz.

Because a band frequency with high efficiency, however, tends to become narrow, enlarging of the inter-coil distance $L_1$, further than a certain distance decreases its efficiency. It follows from this that using the power feed-side and the power receiving-side helical coils 7, 9 that are optimized for obtaining high efficiency at a certain frequency (e.g., 13.3 MHz) keeps the efficiency high, even though the inter-coil distance $L_1$ varies, by varying the radiuses R11, R12 of the power feed-side and power receiving unit loop antennas 6,10.

Figure 17:
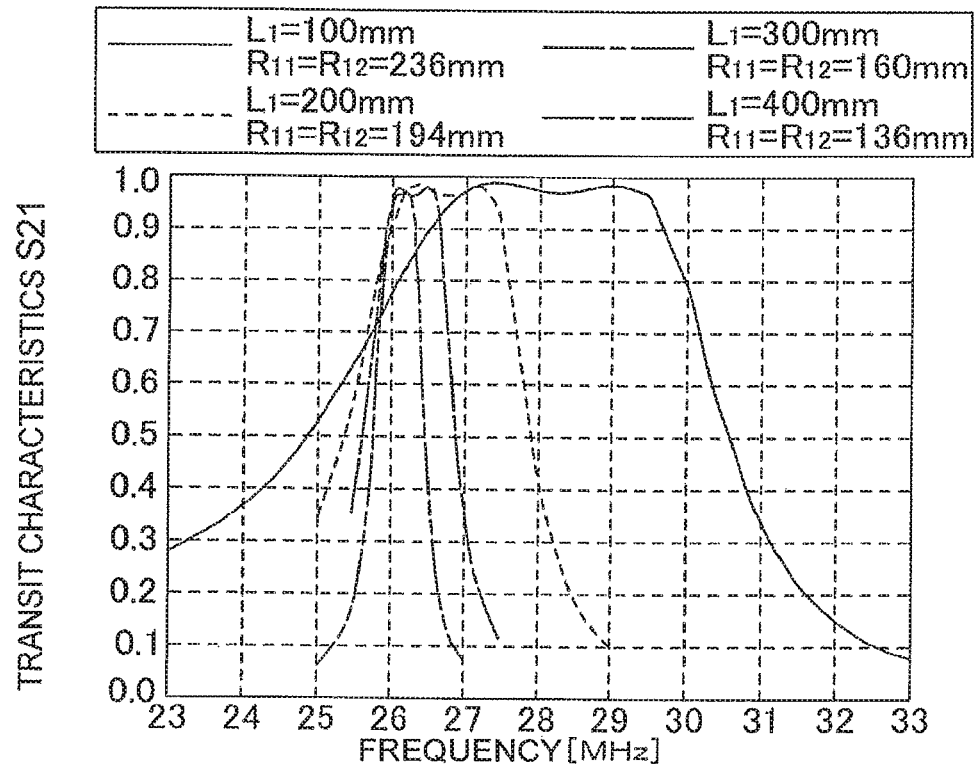
FIG. 17 is a graph illustrating a measured result of a transit characteristics S21 of the power receiving-side loop antenna when radius of power feed-side and power receiving-side loop antenna $R_{11}$, $R_{12}$ is varied in accordance with fluctuation of the inter-coil distance $L_1$ between the power feed-side and the power receiving-side helical coils of the power feed system illustrated in FIG. 10 while resonance frequency of the power feed-side and the power receiving-side helical coils is fixed to 26 MHz.
Figure 18:
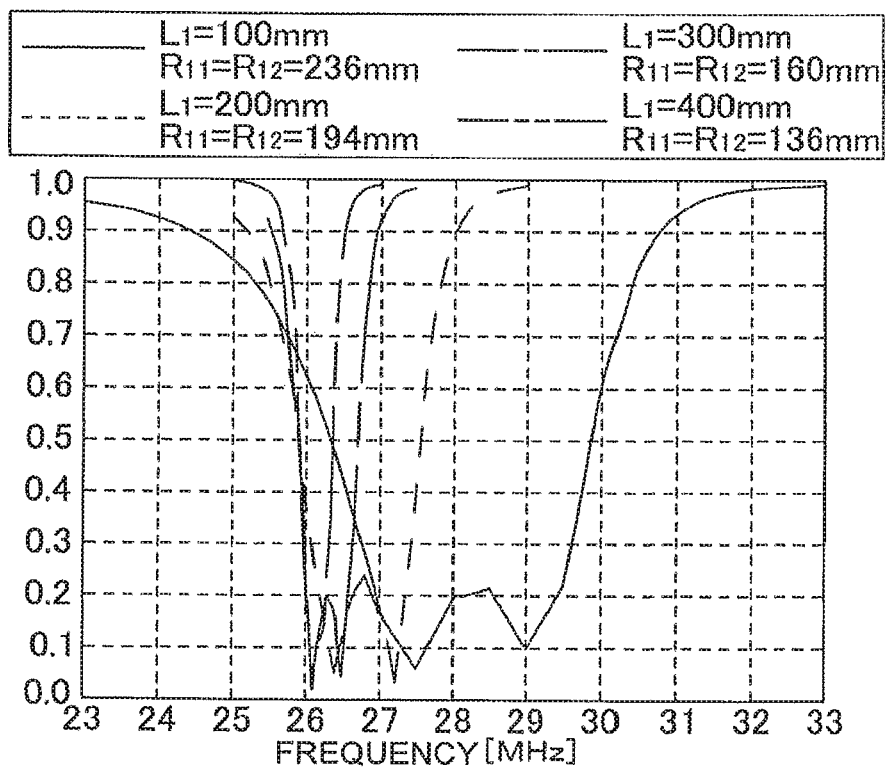
FIG. 18 is a graph illustrating a measured result of a reflection characteristics S11 of the power receiving-side loop antenna when radius of power feed-side loop antenna and power receiving-side loop antenna $R_{11}$, $R_{12}$ is varied in accordance with fluctuation of the inter-coil distance $L_1$ between the power feed-side and the power receiving-side helical coils of the power feed system illustrated in FIG. 10 while resonance frequency of the power feed-side and the power receiving-side helical coils is fixed to 26 MHz.

Also, the inventor et al., in order to examine whether or not the foregoing characteristics is obtained even though resonance frequency is varied, measured the transit characteristics S21 and the reflection characteristics S11 when the radiuses R11, R12 of the power feed-side and power receiving unit loop antennas 6, 10 are varied in accordance with fluctuation of the inter-coil distance $L_1$, while the number of turns of the power feed-side and the power receiving-side helical coils 7, 9 is set three, and the resonance frequency near 26 MHz. The results are shown in FIGS. 17 and 18. In the measurement shown in these figures, the inter-coil distance $L_1$ and the radiuses $R_{11}$, $R_{12}$ are set as in Table 4 shown below.

TABLE 4

| $L_1$ | $R_{11} = R_{12}$ |
|---|---|
| 100 mm | 236 mm |
| 200 mm | 194 mm |
| 300 mm | 160 mm |
| 400 mm | 136 mm |

It should be noted that in the measurement shown in FIGS. 17 and 18, as the number of turns of the power feed-side and the power receiving-side helical coils 7, 9 was set three, the resultant lengths $L_{21}$, $L_{22}$ each became 24 mm, but other parameters are the same as shown in FIGS. 12 to 16.

As shown in those figures, when resonance frequency is made 26 MHz, it is made possible to keep its efficiency and frequency constant even though the inter-coil distance $L_1$ varies, by varying radius of the power feed-side and the power receiving-side loop antennas 6, 10.

As conventionally described, for example, when power is fed from the power feed unit 3 installed in the road 2 to power receiving unit 5 mounted in the body of the automobile 4, the inter-coil distance $L_1$ differs from types of automobiles (e.g., sports cars are formed low, station wagons high). Therefore, the power feed-side and the power receiving-side loop antennas 6, 10 that differ among types of automobile in its dimension are generally disposed, causing types of the power feed-side and the power receiving-side loop antennas 6, 10 to increase, which incurs cost.

In the present invention, by use of power receiving-side loop antenna 10 which dimension is arranged variable, the power receiving unit 5 is attached that is provided with the power receiving unit antenna 10 adjusted at manufacturing process so as to obtain high efficiency. Since using the power receiving unit antenna 10 common independently of types of automobile makes power supply highly efficient, it is thus made possible to prevent increase of types of the power receiving-side loop antenna 10, and thus to reduce coat. Configuration of varying dimension of this power receiving-side loop antenna 10 will be descried later.

Figure 19:
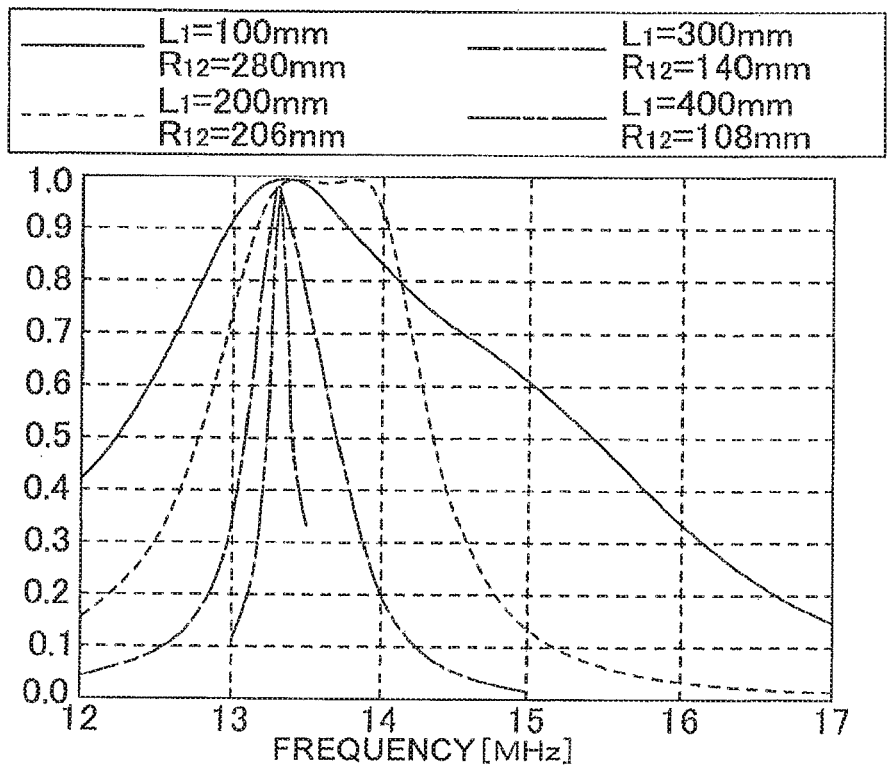
FIG. 19 is a graph illustrating a measured result of a transit characteristics S21 when the radius of power feed-side loop antenna $R_{11}$ of the power feed system illustrated in FIG. 10 is fixed to 250 mm, and the radius of the power receiving-side loop antenna $R_{12}$ is solely varied in accordance with fluctuation of the inter-coil distance $L_1$.
Figure 20:
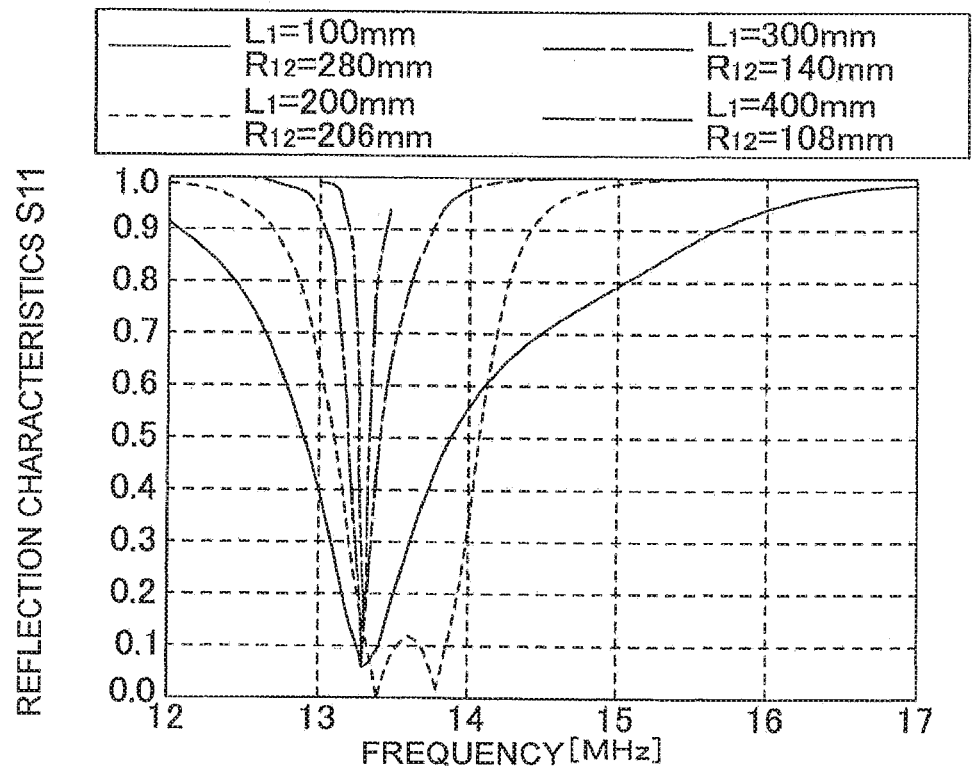
FIG. 20 is a graph illustrating a measured result of a reflection characteristics S11 when the radius of power feed-side loop antenna $R_{11}$ is fixed to 250 mm, and the radius of the power receiving-side loop antenna $R_{12}$ is solely varied in accordance with fluctuation of the inter-coil distance $L_1$.

Power is fed to the power receiving unit 5 mounted in the body of the automobile 4 from the power feed unit 3 installed in the road 2, and when the inter-coil distance $L_1$ differs from type of the automobiles, it is desirable to vary only the dimension of the power receiving-side loop antenna 10 provided in the automobile 4, and to keep constant the dimension of the power feed-side loop antenna 6. Therefore, the inventor et al. measured the transit characteristics S21 and the reflection characteristics S11 when the radius $R_{11}$ of the power feed-side loop antenna 6 is fixed to 250 mm, and that $R_{12}$ of the power receiving-side loop antenna 10 is varied in accordance with the inter-coil distance $L_1$. The results are shown in FIGS. 19 and 20.

It was found that as shown in those figures, varying the radius $R_{12}$ of the power receiving-side loop antenna 10 even though the radius $R_{11}$ of the power feed-side loop antenna 6 is fixed, made it possible to supply power in high efficient way even though the inter-coil distance $L_1$ varies. Comparing this case with that in which both the radiuses $R_{11}$, $R_{12}$ of the power feed-side and power receiving-side loop antennas 6,10 are varied, because the scope of fluctuation of the radiuses $R_{11}$, $R_{12}$ is required to increase, it is conceivable that corresponding scope of fluctuation of the inter-coil distance L1 becomes narrow. Furthermore, comparing this case with that in which both the radiuses $R_{11}$, $R_{12}$ of the power feed-side and power receiving-side loop antennas 6, 10 are varied, a band frequency with high efficiency tends to become slightly narrow.

Figure 21:
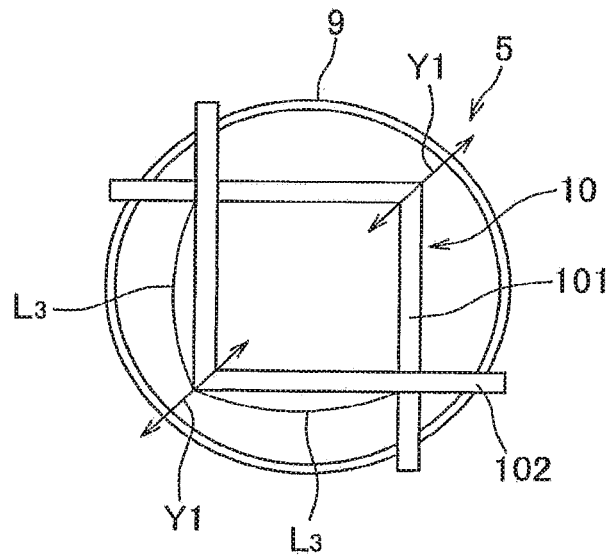
FIG. 21 is a detailed top view illustrating the power receiving unit in the third embodiment.

Then, the configuration of the power receiving-side loop antenna 10 of the present invention will be described in detail with reference to FIG. 21. As shown in FIG. 21, the power receiving-side loop antenna 10 is composed of L-shaped members 101, 102 dividing a square loop in two. The L-shaped members 101, 102 are formed into a band plate with the same shape and dimension. These L-shaped members 101, 102 are overlaid and contact to each other so as to form square loop. According to power receiving-side loop antenna 10, the L-shaped members 101, 102 are moved diagonally in the square loop as shown by the arrow $Y_1$, and it is thus made possible to vary the length $L_3$, i.e., its loop dimension.

In these L-shaped members 101, 102, the length $L_3$ is adjusted at manufacturing process in accordance with type of automobile by moving L-shaped members 101, 102 in the arrow $Y_1$ direction. It is desired that in order to keep well electric characteristics of the contact portion, a portion where the L-shaped members 101, 102 are overlaid to is held by such a finger.

Figure 22:
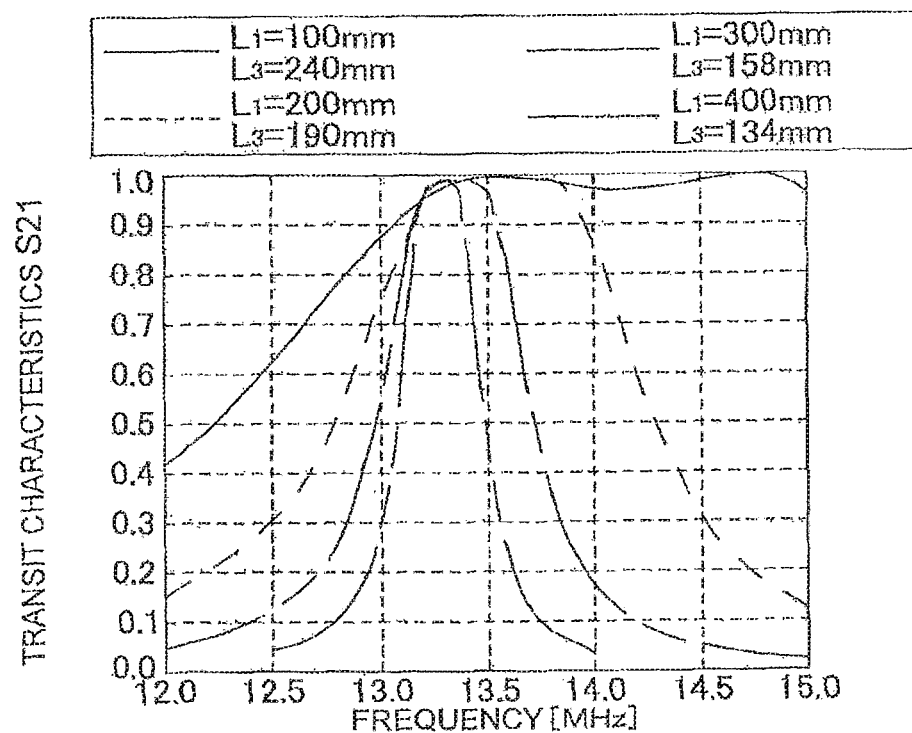
FIG. 22 is a graph illustrating a measured result of a transit characteristics S21 when a length of the power receiving-side loop antenna $L_3$ of the power feed system illustrated in FIG. 10 is varied in accordance with fluctuation of the inter-coil distance $L_1$.

It is concerned that in the case of the foregoing power receiving-side loop antenna 10 shown in FIG. 21, a portion protruding from the loop ill-affects its characteristics. The inventor et al., in order to determine ill effect, measured the transit characteristics S21 when the length $L_3$ of the power receiving-side loop antenna 10 is varied in accordance with fluctuation of the inter-coil distance $L_1$. The result is shown in FIG. 22. In the measurement of FIG. 22, the inter-coil distance $L_1$ and the length $L_3$ are set as shown in Table 5 below.

TABLE 5

| $L_1$ | $L_3$ |
|---|---|
| 100 mm | 240 mm |
| 200 mm | 190 mm |
| 300 mm | 158 mm |
| 400 mm | 134 mm |

As apparent from the figure, it was found that it is made possible to keep the efficiency and the frequency constant even though the inter-coil distance $L_1$ varies, and that the part protruding from the loop ill-affects nothing.

It should be noted that in the foregoing embodiment the power receiving-side loop antenna 10 is formed of, but not limited to, two strip-plate-like L-shaped members 101, 102, which are overlaid to each other so as to form loop, making the loop dimension of the power receiving loop antenna 10 vary. The power receiving-side loop antenna 10 may be such as is provided with a plurality of members for dividing loop, which is each moved so as to vary the dimension of the power receiving-side loop antenna 10, for example, four straight members, which are overlaid to each other so as to become a square loop, thus varying the dimension of the power receiving-side loop antenna 10.

A Fourth Embodiment

Figure 23:
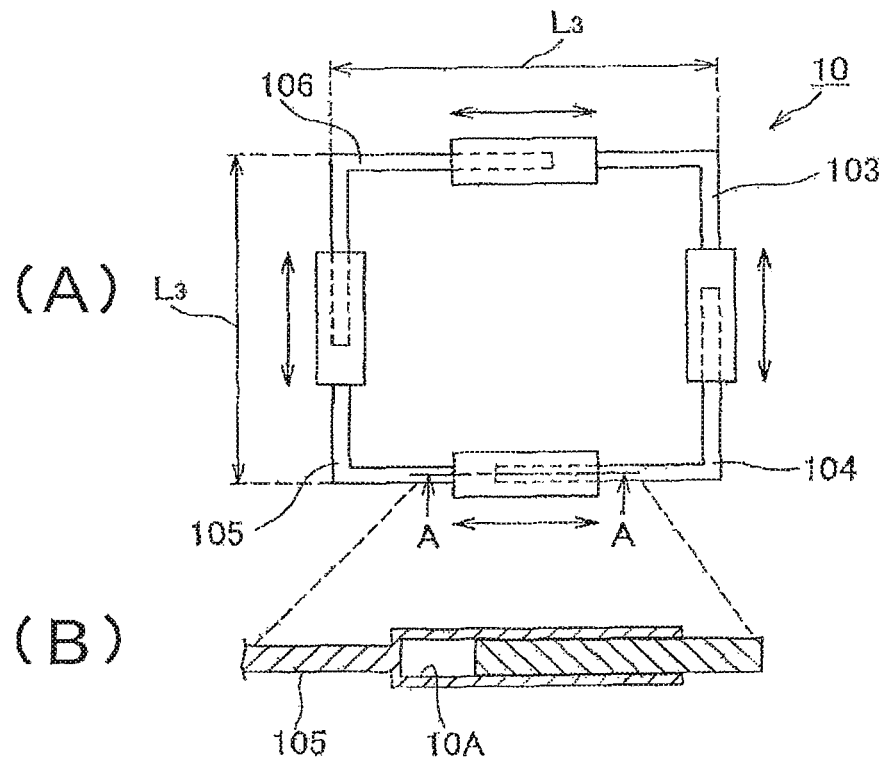
FIG. 23 is a view of a power receiving-side loop antenna in a forth embodiment ((A) in the figure is a top view, and (B) a cross-sectional view taken from I-I in (A)).

Next, the forth embodiment is described. Great difference between the third embodiment and the fourth embodiment is a configuration of its power loop antenna 10. In the aforementioned third embodiment the power loop antenna 10 is composed of two L-shaped members 101, 102, whereas in the aforementioned fourth embodiment, as shown in FIG. 23, it is composed of four L-shaped members 103 to 106.

The aforementioned L-shaped members 103, 105 are formed in such a way that both their ends are thickened more than their middle, and are each further provided with a recess 10A recessed toward its middle. Both ends of L-shaped members adjacent to the aforementioned L-shaped members 104, 106 are slidably inserted into the recess 10A. Inserting the both ends of the L-shaped members 104, 106 into each recess 10A provided with the both ends of the L-shaped members 103, 105 thus forms square loop.

In the recess 10A sliding the both ends of the L-shaped members 104, 106 allows the length of the square loop $L_3$ to vary. It is also desired in this case that in order to keep well electric characteristics of the contact portion, the both ends of the L-shaped members 103, 105 into which the L-shaped members 104, 106 are inserted are held by such a finger.

A Fifth Embodiment

Figure 24:
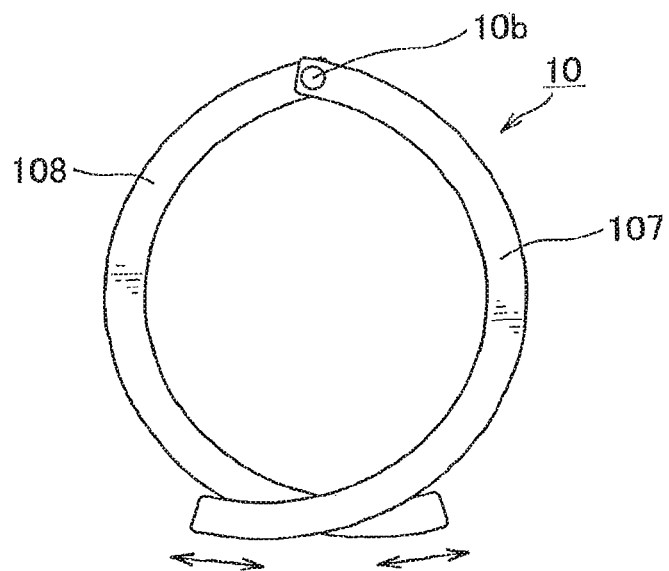
FIG. 24 is a top view of a power receiving-side loop antenna in a fifth embodiment.

Next, the fifth embodiment is described. Great difference between the third embodiment and the fifth embodiment is a configuration of its power loop antenna 10. In the aforementioned third embodiment the power loop antenna 10 is composed of two L-shaped members 101, 102, whereas in the aforementioned fifth embodiment, as shown in FIG. 24, the power receiving unit antenna 10 is composed of two half circular arc members 107 to 108.

Furthermore, each one end of the half circular arc members 107 and 108 is overlaid to each other, and is connected to each other as it stands by a hinge 10b. Namely, the half circular arc members 107 and 108 are disposed rotative about the hinge 10b. Each of the other ends of the half circular arc members 107 and 108 is solely overlaid to each other as is the aforementioned first embodiment.

According to the above configuration, when the other end of the half circular member 107 is rotated in the left side direction of the figure, the other end of the half circular member 108 in the right side direction of the figure, the dimension of the circular loop becomes small, whereas when the other end of the half circular member 107 is rotated in the right side direction of the figure, the other end of the half circular member 108 in the left side direction of the figure, the dimension of the circular loop becomes large. It is also desired in this case that in order to keep well electric characteristics of the contact portion, the both ends where the half circular arc members 107, 108 are overlaid to each other are held by such a finger.

A Sixth Embodiment

Figure 25:
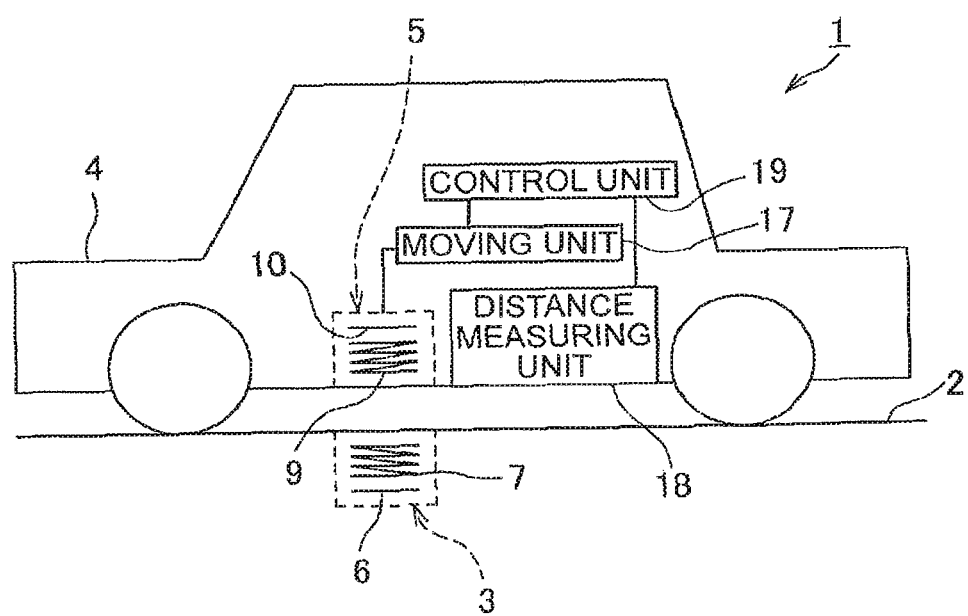
FIG. 25 is a view of a power feed system in a sixth embodiment.

Next, the sixth embodiment is described. While in the aforementioned embodiments the dimension of the power receiving-side loop antenna 10 is adjusted at manufacturing process each type of automobile, it is conceivable that in the sixth embodiment as shown in FIG. 25, a moving unit 17 as moving unit means such as motor for either driving the L-shaped members 101 to 106 or the half circular arc members 107, 108 composing the power receiving unit antenna 10, and a distance measuring unit 18 as measuring means for measuring the inter-coil distance $L_1$ are provided, the moving unit 17 is controlled by a control unit 19 that serves as moving unit controlling means such as a center processor unit such that the dimension of the loop accords with the inter-coil distance $L_1$ measured by the distance measuring unit 18, and thus these L-shaped members 101 to 106, or the half circular arc members 107, 108 are moved.

This makes it possible to vary the dimension of the loop such that even though the inter-coil distance $L_1$ between the power feed-side helical coil 7 and the power receiving-side helical coil 9 is varied, power is supplied highly efficiently and automatically. It is noted that it is conceivable that such infrared or radio communication is employed as the distance measuring unit 18. This makes it possible to supply power in high efficient manner automatically.

A Seventh Embodiment

Figure 26:
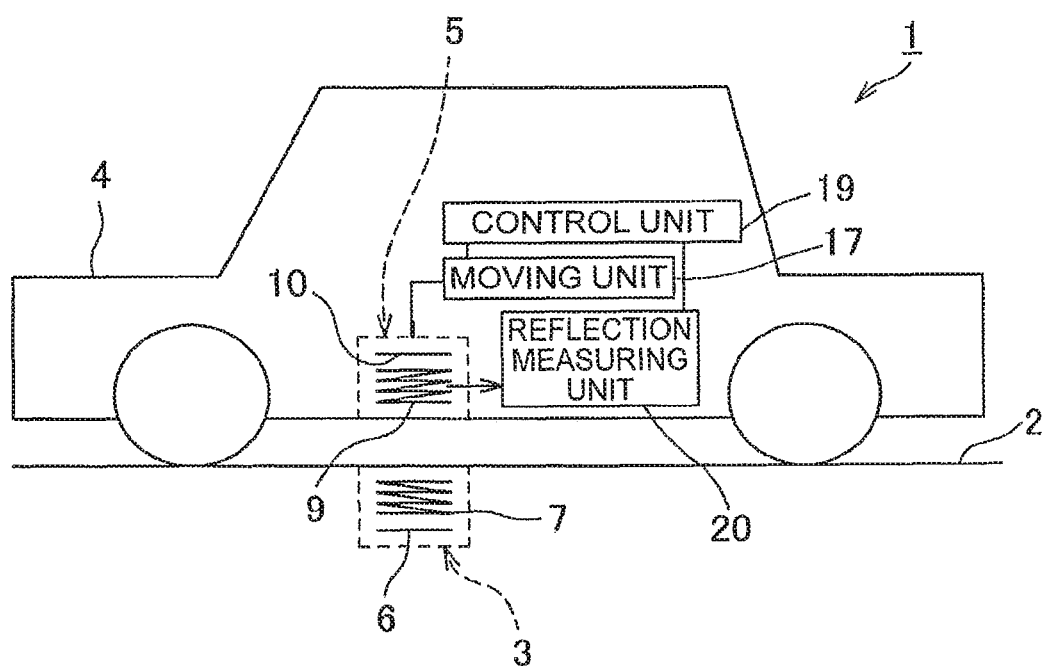
FIG. 26 is a view of a power feed system in a seventh embodiment.

Next, the seventh embodiment is described. In the aforementioned sixth embodiment the L-shaped members 101 to 106 or the half circular arc members 107, 108 are moved in accordance with the inter-coil distance $L_1$ measured by the distance measuring unit 18, whereas in the seventh embodiment as shown in FIG. 26, it is conceivable that a reflection measuring unit 20 is instead for the distance measuring unit 18, provided for measuring reflection amount from the power receiving-side helical coil 9, and the moving unit 17 is controlled by the control unit 19 so as to improve the reflection characteristics S21 measured by the reflection measuring unit 20, thus driving these L-shaped members 101 to 106, or the half circular arc members 107, 108. It is noted that the aforementioned reflection measuring unit 20 is such a unit as to measure power supplied to the power receiving-side helical coil 9 so as to determine reflection amount from the measured power, for example, an orientation coupler or a circulator which is conceivable to use.

Figure 27:
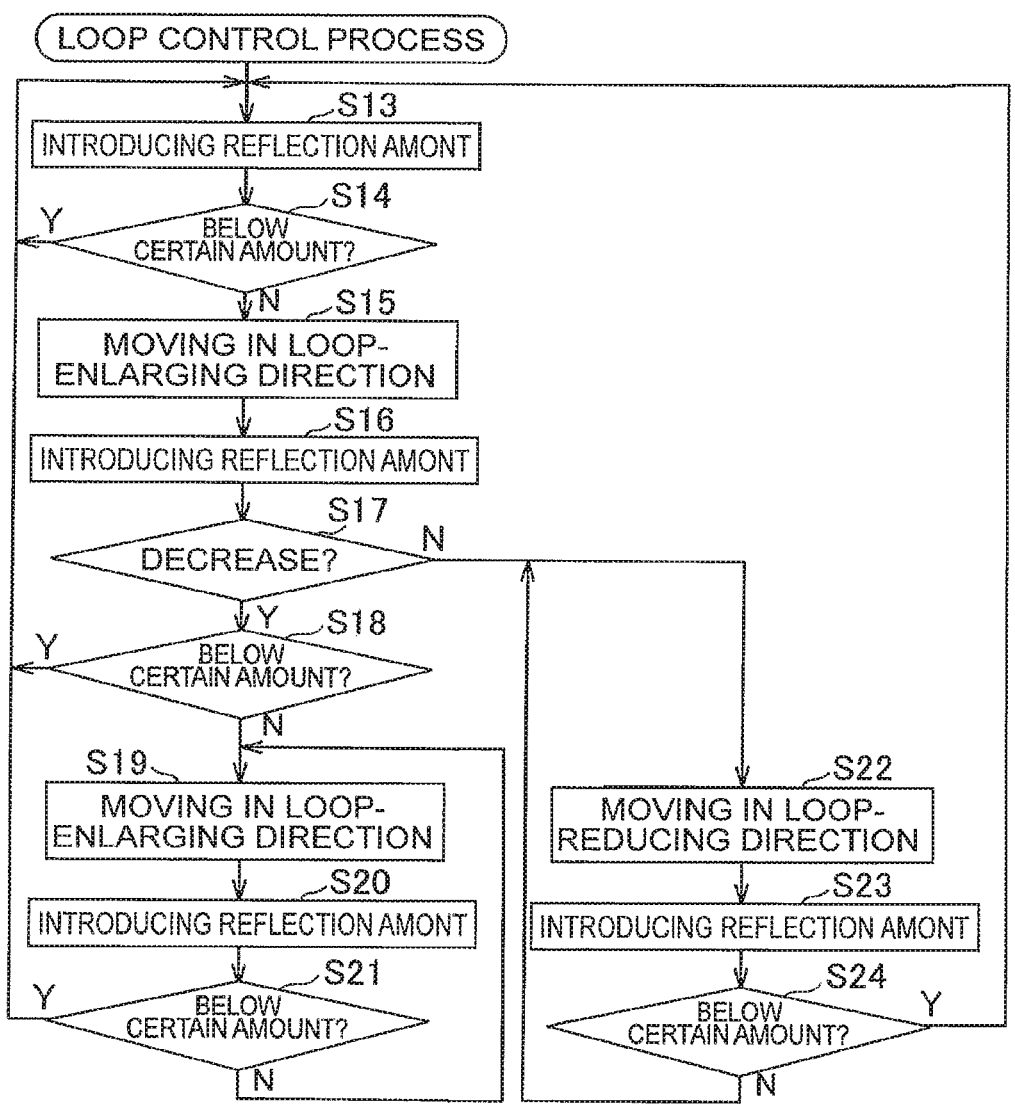
FIG. 27 is a flow diagram showing procedure for a control unit composing the power feed system illustrated in FIG. 26.

Next, operation of the aforementioned control unit 19 is hereinafter described in detail with reference to FIG. 27. In the first place, the control unit 19 detects according to the power supplied to the power receiving-side helical coil 9 measured by the reflection measuring unit 20 whether power supply commences from the power feed unit 3, then starts loop control process. Then, the control unit 19 introduces the reflection amount measured by the reflection measuring unit 20 (step S13), and determines whether or not the reflection amount lies below a certain amount (step S14). The control unit 19, if the reflection amount is below the certain amount (Y in the step S14), again returns to step S13. On the contrary, the control unit 19, if the reflection amount lies above the certain amount (N in step S14), controls the moving unit 17 to move L-shaped members 101 to 106 or the half circular arc 107, 108 in such a direction as to increase the loop dimension (step S15).

Then, the control unit 19 again introduces the reflection amount (step S16), and determines if the reflection amount decreases (step S17) resulting from varying in step 15. If the reflection amount decreases (Y in step S17), then the control unit 19 determines whether the reflection amount lies below the certain amount resulting from decrease of the reflection amount (step S18). If the reflection amount lies below the certain amount, then the control unit 19 again returns to step S13

On the contrary, if the reflection amount exceeds the certain amount (N in step S18), the control unit 19 determines that the inter-coil distance $L_1$ lies short enough to be coupled tightly, again controls the moving unit 17 to move L-shaped members 101 to 106 or the half circular arc 107, 108 in such the direction as to increase the loop dimension (step S19). After that, the control unit 19 again introduces the reflection amount (step S20), the control unit 19, until the introduced reflection amount sinks below the certain amount, repeats performance of step S19. The control unit 19, when the reflection amount introduced in step S20 sinks below the certain amount (Y in step S21), again returns to step S13.

On the other hand, the reflection amount decreases (N in step S17), the control unit 19 determines that the inter-coil distance $L_1$ lies large enough to be coupled loosely, and controls the moving unit 17 inversely to move the L-shaped members 101 to 106 or the half circular arc 107, 108 in such the direction as to decrease the loop dimension (step S22). After that, the control unit 19, again introducing the reflection amount (step S23), repeats performance of step 22 until the introduced amount sinks below the certain amount. When the reflection amount introduced in step S23 sinks below certain amount (Y in step S24), the control unit 19 again returns to step S13. According to the aforementioned seventh embodiment, it is made possible to render the loop dimension as supplied with power in high efficient way automatically.

Figure 9:
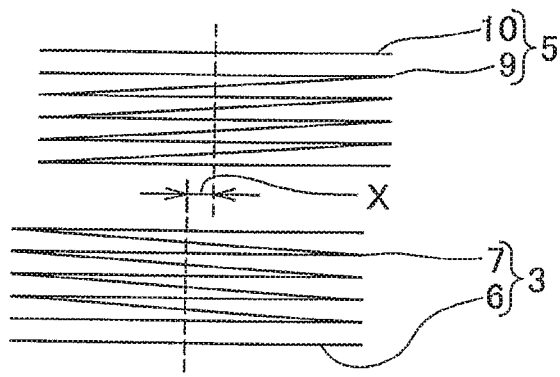
FIG. 9 is an explanation view explaining a lateral shift x.

It is noted that the above mentioned embodiment is configured to prevent such as, but not limited to, reduction of the efficiency by fluctuation of distance. For example, as shown in FIG. 9, it is made possible to correspond to variation of characteristics caused by fluctuation of misalignment x between the axis of the power feed-side loop antenna 6 and the power feed-side helical coil 7, and that of the power receiving-side loop antenna 10 and the power feed-side helical coil 7.

Figure 28:
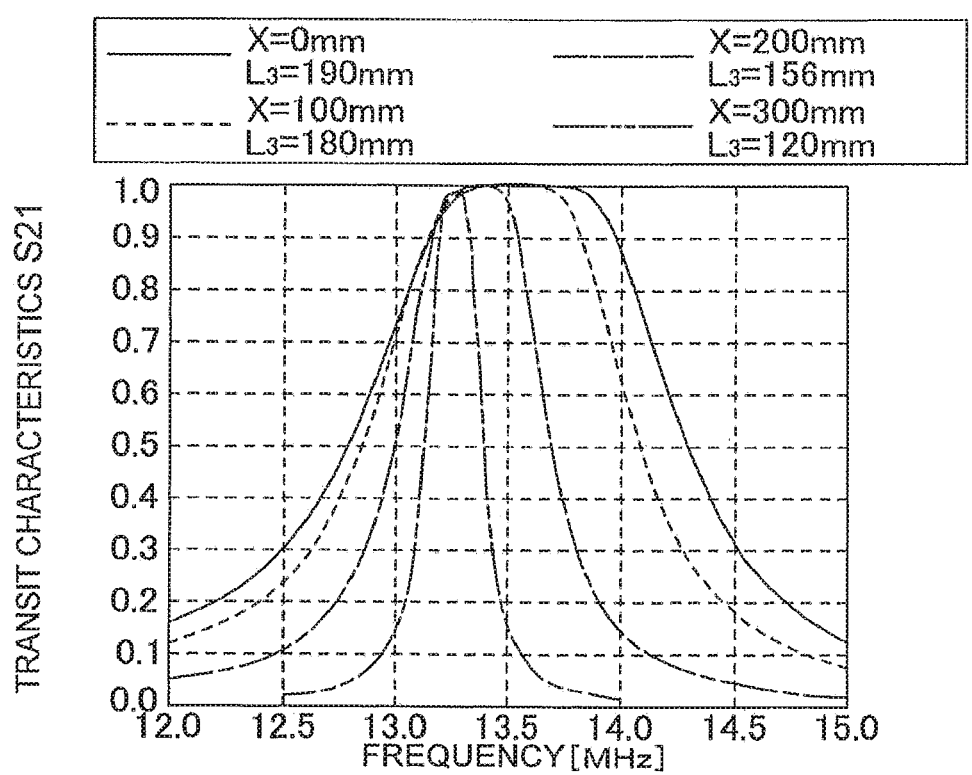
FIG. 28 is a graph illustrating a measured result of a reflection characteristics S21 when a inter-coil distance $L_1$ is fixed to 200 mm so as to correspond to the lateral shift, and a length of the power receiving-side loop antenna $L_3$ in the power feed system illustrated in FIG. 21 is varied.
Figure 29:
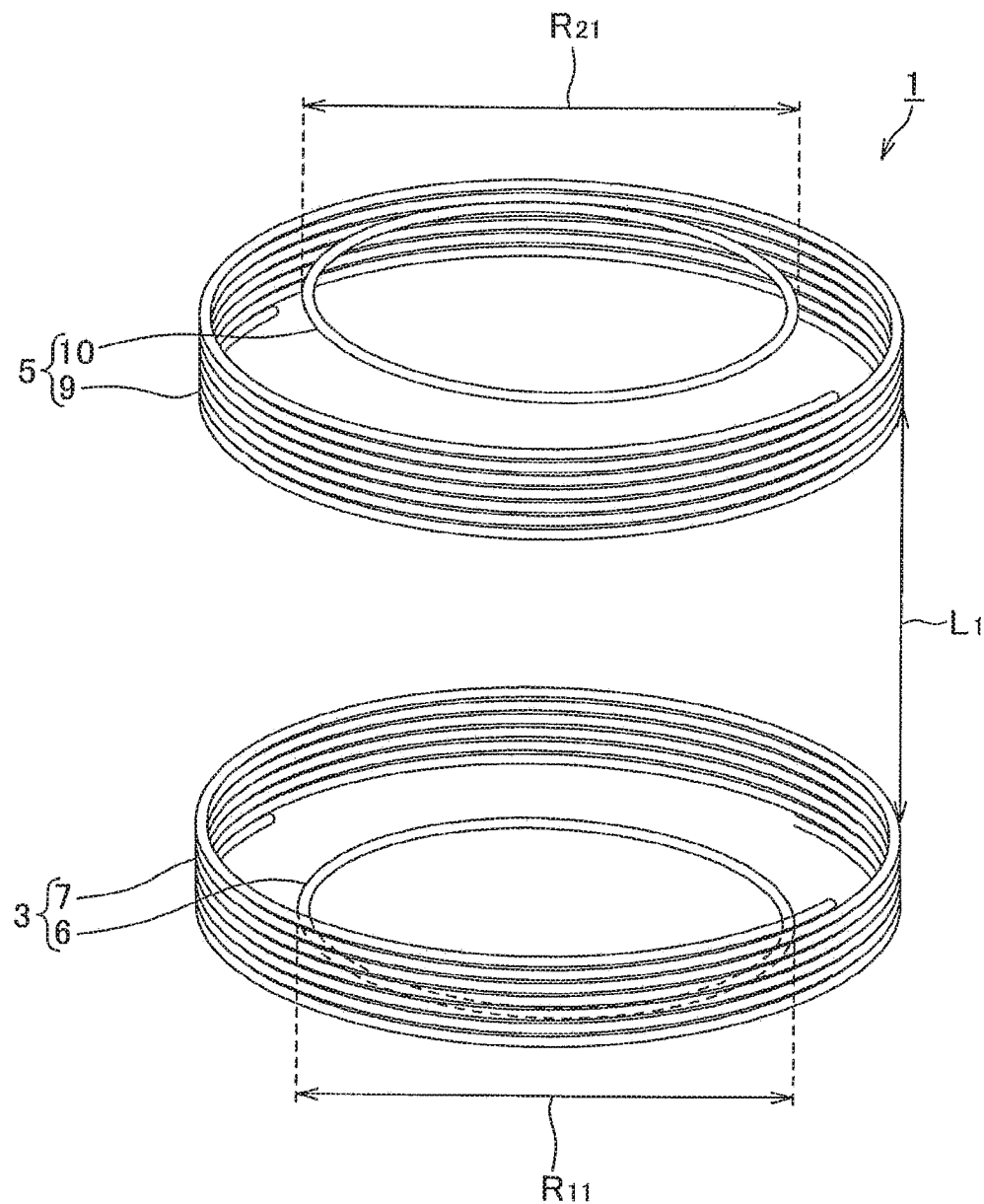
FIG. 29 is a perspective view illustrating an example of a conventional power feed system.
Figure 30:
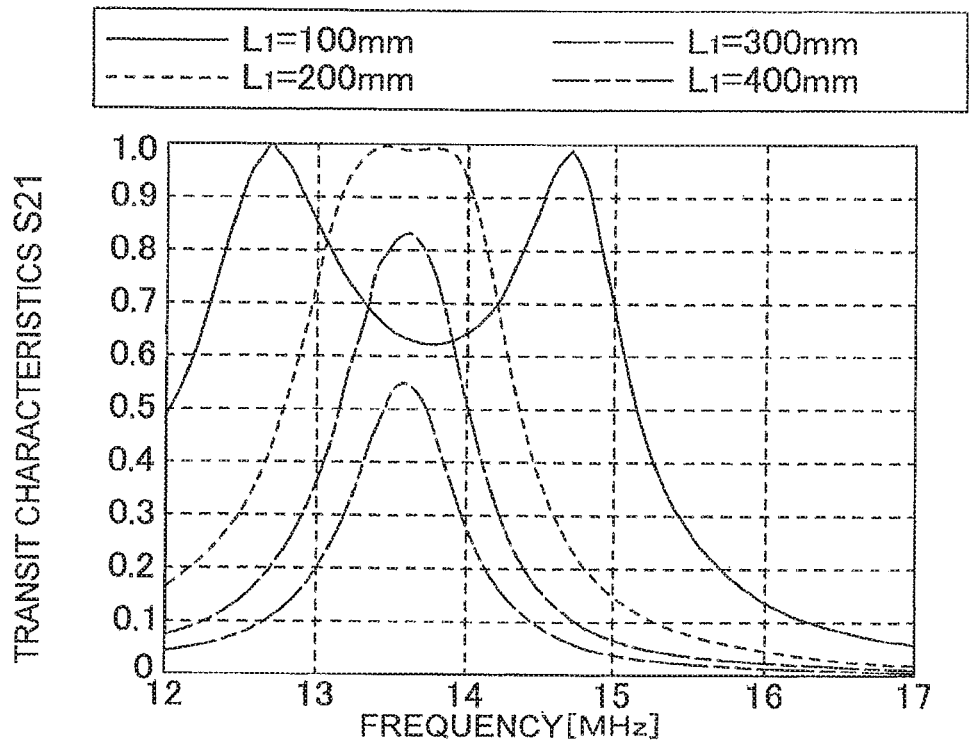
FIG. 30 is a graph illustrating a measured result of a transit characteristics S21 of the power receiving-side loop antenna in the power feed system illustrated in FIG. 29 when the inter-coil distance $L_1$ is varied within a scope of 100 mm to 400 mm while the radius of power feed-side loop antenna and power receiving-side loop antenna $R_{11}$, $R_{12}$ is fixed to 206 mm.
Figure 31:
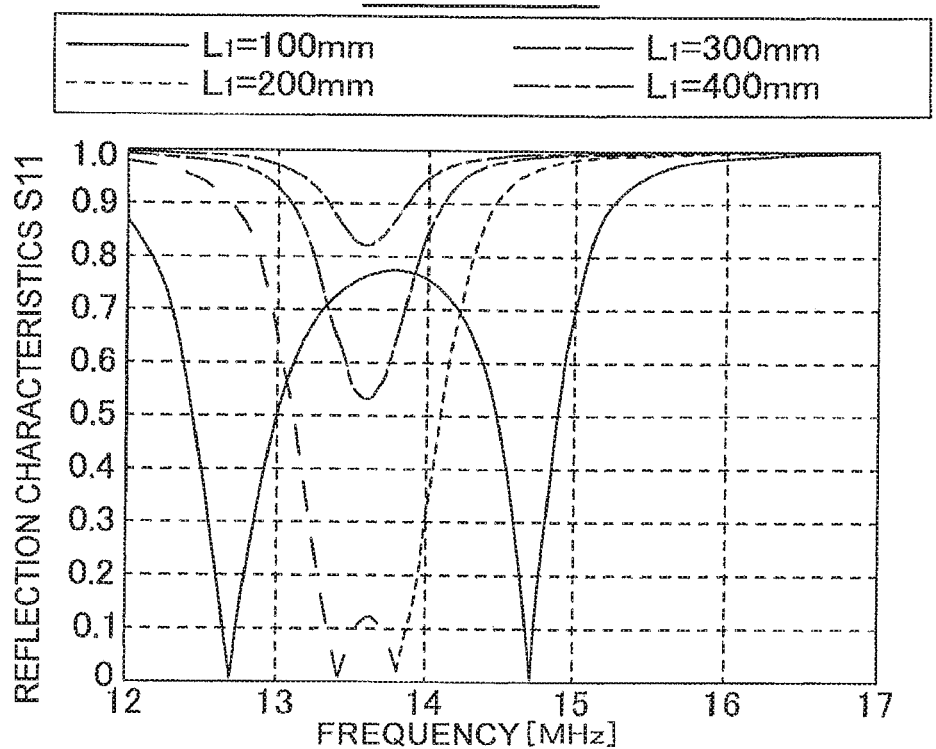
FIG. 31 is a graph illustrating a measured result of a reflection characteristics S11 of the power receiving-side loop antenna in the power feed system illustrated in FIG. 29 when the inter-coil distance $L_1$ is varied within a scope of 100 mm to 400 mm while the radius of power feed-side loop antenna and power receiving-side loop antenna $R_{11}$, $R_{12}$ is fixed to 206 mm.
Figure 32:
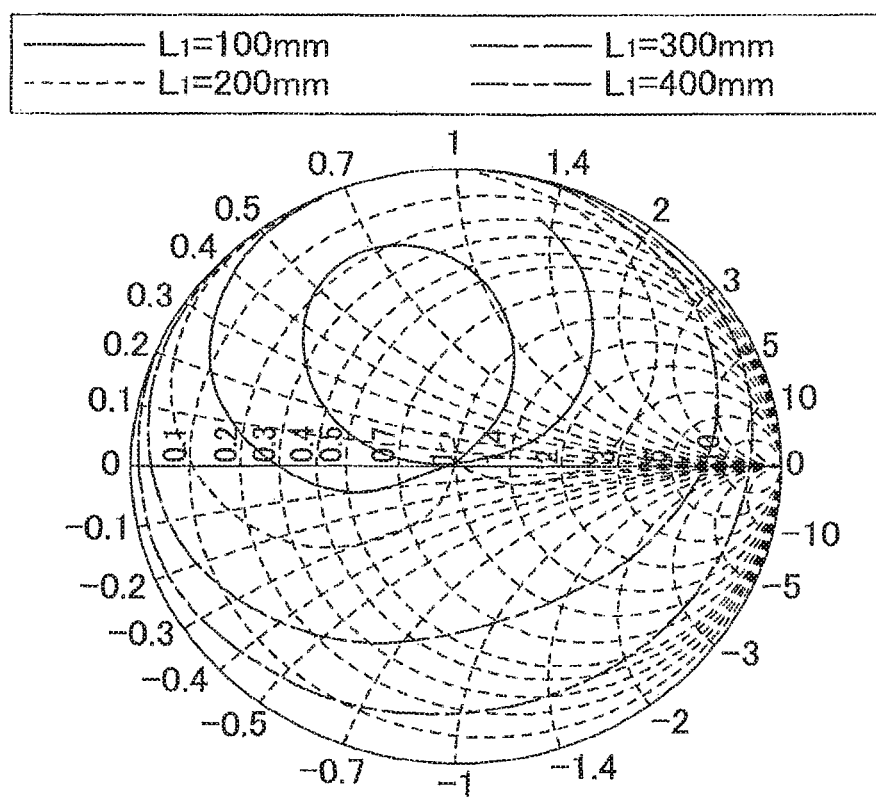
FIG. 32 is a Smith-chard illustrating a measured result of a reflection characteristics S11 of the power receiving-side loop antenna in the power feed system illustrated in FIG. 29 when the inter-coil distance $L_1$ is varied within a scope of 100 mm to 400 mm while the radius of power feed-side loop antenna and power receiving-side loop antenna $R_{11}$, $R_{12}$ is fixed to 206 mm.

The inventor et al., in order to determine the aforementioned effect, measured the reflection characteristics 21 when the distance $L_3$ of the power receiving-side loop antenna 10 is varied in accordance with the fluctuation of the lateral shift x (FIG. 9), with the inter-coil distance $L_1$ 200 mm. The result is shown in FIG. 28. In the FIG. 28 the lateral shift x and the distance $L_3$ are set as shown in TABLE 6 below. As apparent from the figure, it was found that even though the lateral shift x occurs, efficiency and frequency are kept constant by varying the dimensions of the power feed-side and the power receiving-side loop antennas 6, 10. Therefore, according to the aforementioned seventh embodiment, it was found that controlling the dimension of the loop so that the reflection amount lies below the certain amount, makes it possible to correspond to both the fluctuation of the inter-coil distance $L_1$ and the that of lateral shift x.

TABLE 6

| X | $L_3$ |
|---|---|
| 0 mm | 190 mm |
| 100 mm | 180 mm |
| 200 mm | 156 mm |
| 300 mm | 120 mm |

Furthermore, according to the foregoing embodiment, only varying the radius $R_{12}$ of the power receiving unit 10 corresponds to such as, but not limited to, fluctuation of the inter-coil distance $L_1$. For example, either only the radius of the power feed-side loop antenna 6, $R_{11}$ may be varied, or both the radiuses $R_{11}$, $R_{12}$ of the power receiving-side loop antenna 10 and the power feed-side loop antenna 6 may be varied.

Furthermore, the aforementioned power feed system 1 is applied such as, but not limited to, a system supplying power to the automobile 4. The invention can be applied to other system.

Furthermore, the aforementioned embodiments merely show, but not limited to, typical embodiment of the present invention. Namely, it is to be understood that various changes and modifications will be apparent to those skilled in the art. Therefore, unless otherwise such changes and modifications depart from the scope of the present invention hereafter defined, they should be construed as being included therein.

REFERENCE SIGNS LIST

1 power feed system
3 power feed unit (power feed means)
5 power receiving unit (power receiving means)
6 power feed-side loop antenna
7 power feed-side helical coil
8 power feed-side varactor (capacitor)
10 power receiving-side loop antenna
11 power receiving-side varactor (capacitor)
13 distance measuring unit (distance measuring means)
14 control unit (adjusting means)
16 control unit (adjusting means)
17 moving unit (moving means)
18 reflection measuring unit (reflection measuring means)
19 control unit (moving unit controlling means)
20 reflection measuring unit (reflection measuring means)
101 to 106 L-shaped members (members)
107, 108 half circular arc members (members)

The invention claimed is:

1. A power feed system, comprising: a power feeding unit provided with a power feed-side loop antenna for feeding power, and a power feed-side coil electromagnetically coupled with the power feed-side loop antenna; and a power receiving unit provided with a power receiving-side coil electromagnetically resonated with the power feed-side coil, and a power receiving-side loop antenna electromagnetically coupled with the power receiving-side coil, wherein at least one of the power feed-side loop antenna and the power receiving-side loop antenna is divided into a plurality of members, wherein the plurality of members is configured to be moved, and a contact position relative to each other is configured to be changed, so as to vary a length of a part constituting a loop, wherein a hollow recessed inwardly is disposed at an end of at least one of the plurality of members, and an end of the member adjacent to the member having the hollow is slidably inserted into the hollow, and wherein the plurality of members is intersected, overlaid, and contacted to each other so as to form a loop.

2. The power feed system as claimed in claim 1, further comprising:
    an actuator for driving the plurality of members;
    a distance measuring unit for measuring distance between the power feed-side loop antenna and the power receiving-side loop antenna; and
    an actuator control unit for controlling the actuator to move the plurality of members so that the dimension of the loop corresponds to the distance measured by the distance measuring unit.

3. A power feed system, comprising: a power feeding unit provided with a power feed-side loop antenna for feeding power, and a power feed-side coil electromagnetically coupled with the power feed-side loop antenna; and a power receiving unit provided with a power receiving-side coil electromagnetically resonated with the power feed-side coil, and a power receiving-side loop antenna electromagnetically coupled with the power receiving-side coil, wherein at least one of the power feed-side loop antenna and the power receiving-side loop antenna is divided into a plurality of members, the plurality of members is configured to be moved, and a contact position relative to each other is configured to be changed, so as to vary a length of a part constituting a loop thereof, wherein a hollow recessed inwardly is disposed at an end of at least one of the plurality of members, and an end of the member adjacent to the member having the hollow is slidably inserted into the hollow, an actuator for driving the plurality of members; a reflection measuring unit for measuring a reflection amount from the power fed from the feed-side coil to the power receiving-side coil; and an actuator control unit for controlling the actuator to move the plurality of members in accordance with the reflection amount measured by the reflection measuring unit.

* * * * *